United States Patent
Pinto

(10) Patent No.: US 12,106,134 B2
(45) Date of Patent: Oct. 1, 2024

(54) MECHANISM TO DYNAMICALLY ALLOCATE PHYSICAL STORAGE DEVICE RESOURCES IN VIRTUALIZED ENVIRONMENTS

(71) Applicant: Samsung Electronics Co., Ltd., Suwon-si (KR)

(72) Inventor: Oscar P. Pinto, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/341,371

(22) Filed: Jun. 7, 2021

(65) Prior Publication Data

US 2021/0294507 A1    Sep. 23, 2021

Related U.S. Application Data

(63) Continuation of application No. 15/959,108, filed on Apr. 20, 2018, now Pat. No. 11,036,533, which is a
(Continued)

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5077* (2013.01); *G06F 12/0238* (2013.01);
(Continued)

(58) Field of Classification Search
CPC .. G06F 9/45558; G06F 9/5077; G06F 12/109; G06F 12/0246; G06F 2009/45579;
(Continued)

(56) References Cited

U.S. PATENT DOCUMENTS 7,962,563 B2    6/2011   Becker-Szendy et al.
8,595,385 B1 *  11/2013  Shapiro .................. G06F 13/385
                                                    710/52
(Continued)

FOREIGN PATENT DOCUMENTS

CN          107783913 A        3/2018

OTHER PUBLICATIONS

Final Office Action for U.S. Appl. No. 14/862,145, mailed Dec. 28, 2017.
(Continued)

*Primary Examiner* — Sisley N Kim
(74) *Attorney, Agent, or Firm* — Renaissance IP Law Group LLP

(57) ABSTRACT

A storage device is disclosed. The storage device may include storage for data and at least one Input/Output (I/O) queue for requests from at least one virtual machine (VM) on a host device. The storage device may support an I/O queue creation command to request the allocation of an I/O queue for a VM. The I/O queue creation command may include an LBA range attribute for a range of Logical Block Addresses (LBAs) to be associated with the I/O queue. The storage device may map the range of LBAs to a range of Physical Block Addresses (PBAs) in the storage.

19 Claims, 14 Drawing Sheets

Related U.S. Application Data continuation-in-part of application No. 14/862,145, filed on Sep. 22, 2015, now Pat. No. 10,838,852.

(60) Provisional application No. 62/642,596, filed on Mar. 13, 2018, provisional application No. 62/149,509, filed on Apr. 17, 2015.

(51) Int. Cl.
*G06F 12/02* (2006.01)
*G06F 12/109* (2016.01)
*G06F 13/00* (2006.01)
*H04L 47/62* (2022.01)

(52) U.S. Cl.
CPC ........ *G06F 12/0246* (2013.01); *G06F 12/109* (2013.01); *G06F 13/00* (2013.01); *G06F 2009/45579* (2013.01); *G06F 2009/45595* (2013.01); *G06F 2212/151* (2013.01); *G06F 2212/206* (2013.01); *G06F 2212/657* (2013.01); *G06F 2212/7201* (2013.01); *H04L 47/6215* (2013.01)

(58) Field of Classification Search
CPC ........... G06F 2009/45595; G06F 13/00; G06F 12/0238; G06F 2212/7201; G06F 2212/657; G06F 2212/206; G06F 2212/151; H04L 47/6215
See application file for complete search history.

(56) References Cited

U.S. PATENT DOCUMENTS

| | | | |
|---|---|---|---|
| 9,276,824 | B2 | 3/2016 | Shimmitsu et al. |
| 9,389,895 | B2 | 7/2016 | Oshins et al. |
| 9,501,245 | B2 | 11/2016 | Hussain et al. |
| 9,720,717 | B2 | 8/2017 | Carson et al. |
| 10,970,104 | B2 | 4/2021 | Yu et al. |
| 2002/0144001 | A1 | 10/2002 | Collins et al. |
| 2005/0138242 | A1 | 6/2005 | Pope et al. |
| 2005/0210479 | A1 | 9/2005 | Andjelic |
| 2005/0256976 | A1 | 11/2005 | Susairaj et al. |
| 2006/0195663 | A1 | 8/2006 | Arndt et al. |
| 2006/0236063 | A1 | 10/2006 | Hausauer et al. |
| 2008/0229035 | A1 | 9/2008 | Thayer et al. |
| 2009/0122627 | A1 | 5/2009 | Rao |
| 2013/0198312 | A1 | 8/2013 | Tamir et al. |
| 2013/0305006 | A1 | 11/2013 | Altman et al. |
| 2014/0129753 | A1 | 5/2014 | Schuette et al. |
| 2014/0208062 | A1 | 7/2014 | Cohen |
| 2014/0281040 | A1 | 9/2014 | Liu |
| 2014/0281083 | A1 | 9/2014 | Canepa et al. |
| 2014/0281171 | A1 | 9/2014 | Canepa |
| 2014/0282514 | A1 | 9/2014 | Carson et al. |
| 2014/0317219 | A1 | 10/2014 | Fitch et al. |
| 2014/0331001 | A1 | 11/2014 | Liu et al. |
| 2015/0143134 | A1* | 5/2015 | Hashimoto ........... H04L 9/0816 713/193 |
| 2016/0004438 | A1* | 1/2016 | Moon ..................... G06F 3/061 711/103 |
| 2016/0170903 | A1* | 6/2016 | Kanno ................ G06F 12/0246 711/103 |
| 2016/0306580 | A1 | 10/2016 | Pinto |
| 2016/0306658 | A1 | 10/2016 | Serebrin |
| 2016/0321113 | A1 | 11/2016 | Pinto et al. |
| 2017/0024132 | A1 | 1/2017 | Jun et al. |
| 2017/0235510 | A1 | 8/2017 | Hu et al. |
| 2017/0329625 | A1 | 11/2017 | Li |
| 2018/0004559 | A1* | 1/2018 | Geml .................. G06F 21/6209 |
| 2018/0321879 | A1* | 11/2018 | Lu ............................ G06F 3/06 |
| 2018/0335971 | A1* | 11/2018 | Borikar ................. G06F 3/0605 |
| 2019/0004941 | A1 | 1/2019 | Genshaft et al. |
| 2019/0074283 | A1* | 3/2019 | Amaki ................... G11C 16/26 |

OTHER PUBLICATIONS

Final Office Action for U.S. Appl. No. 14/862,145, mailed Nov. 19, 2019.
Final Office Action for U.S. Appl. No. 15/959,108, mailed Mar. 9, 2020.
Hung, Jijun, et al., "PCI Express-based NVMe Solid State Disk," Applied Mechanics and Materials, vol. 464, 365-8, 2014; ISSN: 1660-9336; DOI: 10.4028/www.scientific.net/AMM.464.365; Publisher: Trans Tech Publications, Switzerland, Nov. 2013.
Intel Corporation, "NVM Express," NVM Express 1.0e, Jan. 23, 2013 (127 pages).
Notice of Allowance for U.S. Appl. No. 14/862,145, mailed Jun. 17, 2020.
Notice of Allowance for U.S. Appl. No. 15/959,108, mailed Feb. 11, 2021.
Notice of Allowance for U.S. Appl. No. 15/959,108, mailed Jun. 24, 2020.
Office Action for U.S. Appl. No. 14/862,145, mailed Apr. 2, 2020.
Office Action for U.S. Appl. No. 14/862,145, mailed Jun. 27, 2017.
Office Action for U.S. Appl. No. 14/862,145, mailed May 3, 2019.
Office Action for U.S. Appl. No. 15/959,108, mailed Oct. 18, 2019.
Storage Switzerland, LLC, "Docker: What do Storage Pros need to know?", Independent Analysis of Storage and Data Protection, 2015 (3 pages).
Final Office Action for U.S. Appl. No. 17/024,649, mailed Mar. 28, 2022.
Notice of Allowance for U.S. Appl. No. 17/024,649, mailed Jun. 15, 2022.
Office Action for U.S. Appl. No. 17/024,649, mailed Oct. 14, 2021.
Office Action for U.S. Appl. No. 17/341,375, mailed Nov. 23, 2022.
Notice of Allowance for U.S. Appl. No. 17/341,375, mailed May 11, 2023.
Office Action for U.S. Appl. No. 17/972,580, mailed Jun. 23, 2023.

* cited by examiner

MECHANISM TO DYNAMICALLY ALLOCATE PHYSICAL STORAGE DEVICE RESOURCES IN VIRTUALIZED ENVIRONMENTS

RELATED APPLICATION DATA

This application is a continuation of U.S. patent application Ser. No. 15/959,108, filed Apr. 20, 2018, now allowed, which claims the benefit of U.S. Provisional Patent Application Ser. No. 62/642,596, filed Mar. 13, 2018, and which is a continuation-in-part of U.S. patent application Ser. No. 14/862,145, filed Sep. 22, 2015, now U.S. Pat. No. 10,838,852, issued Nov. 17, 2020, which claims the priority benefit under 35 U.S.C. § 119(c) of U.S. Provisional Patent Application Ser. No. 62/149,509, filed Apr. 17, 2015. U.S. patent application Ser. No. 15/959,108, filed Apr. 20, 2018, U.S. patent application Ser. No. 14/862,145, filed Sep. 22, 2015, and U.S. Provisional Patent Application Ser. No. 62/642,596, filed Mar. 13, 2018 are incorporated by reference herein for all purposes.

This application is related to U.S. patent application Ser. No. 17/024,649, filed Sep. 17, 2020, which is a continuation of U.S. patent application Ser. No. 14/862,145, filed Sep. 22, 2015, now U.S. Pat. No. 10,838,852, issued Nov. 17, 2020, which claims the priority benefit under 35 U.S.C. § 119(c) of U.S. Provisional Patent Application Ser. No. 62/149,509, filed Apr. 17, 2015.

This application is related to U.S. patent application Ser. No. 17,341,375, filed, Jun. 7, 2021, which is a divisional of U.S. patent application Ser. No. 15/959,108, filed Apr. 20, 2018, which claims the benefit of U.S. Provisional Patent Application Ser. No. 62/642,596, filed Mar. 13, 2018, and which is a continuation-in-part of U.S. patent application Ser. No. 14/862,145, filed Sep. 22, 2015, which claims the priority benefit under 35 U.S.C. § 119(e) of U.S. Provisional Patent Application Ser. No. 62/149,509, filed Apr. 17, 2015. U.S. patent application Ser. No. 15/959,108, filed Apr. 20, 2018, U.S. patent application Ser. No. 14/862,145, filed Sep. 22, 2015, and U.S. Provisional Patent Application Ser. No. 62/642,596, filed Mar. 13, 2018 are incorporated by reference herein for all purposes.

FIELD

The inventive concepts relate generally to storage devices, and more particularly supporting access to storage devices by virtual machines that may be isolated from each other.

BACKGROUND

Single Root Input/Output Virtualization (SR-IOV) is a specification-backed interface mechanism that allows a single physical Peripheral Component Interconnect Express (PCIe) device to appear as multiple, separate physical PCIe devices. SR-IOV helps share and isolate PCIe resources for performance and manageability reasons while simultaneously promoting interoperability.

SR-IOV has existed for a decade for network adapters. Very recently, SR-IOV has begun to include storage. Central Processing Unit (CPU) processing already provides resource isolation that has helped rapid virtualization adoption through a hypervisor as a primary device and virtual machines (VMs) as secondary devices. With SR-IOV, network and storage devices expose a physical function device (PF) and virtual function devices (VFs). These jointly provide device isolation sufficient to transform a physical server into multiple virtual servers so entire applications may each run in their own isolated space.

Even though computing processing, network, and storage form the three virtualization pillars, storage devices and storage device vendors have lagged in conforming to SR-IOV. This fact may be because, unlike with networking, storage defines a data address space referenced by a range of logical block addresses (LBAs). This LBA range may only be subdivided into a finite number of units. Moreover, storage devices require physical hardware gates to support additional VFs, since a VF are hardware functionality exposed directly to a VM's Peripheral Component Interconnect (PCI) space. Adding SR-IOV to a storage/network device increases its gate count and chip size and consumes more power.

SR-IOV solves the hardware isolation issue while providing bare-metal performance since, unlike para-virtualized devices, I/O does not have to go through the hypervisor. Non-Volatile Memory Express (NVMe) storage devices are the latest to adopt SR-IOV. But for storage there may be other mechanisms to provide isolated access for multiple VMs.

A need remains for a way to offer functionality like that offered by SR-IOV, but without the hardware requirements and limitations imposed by SR-IOV.

DETAILED DESCRIPTION

Figure 1:
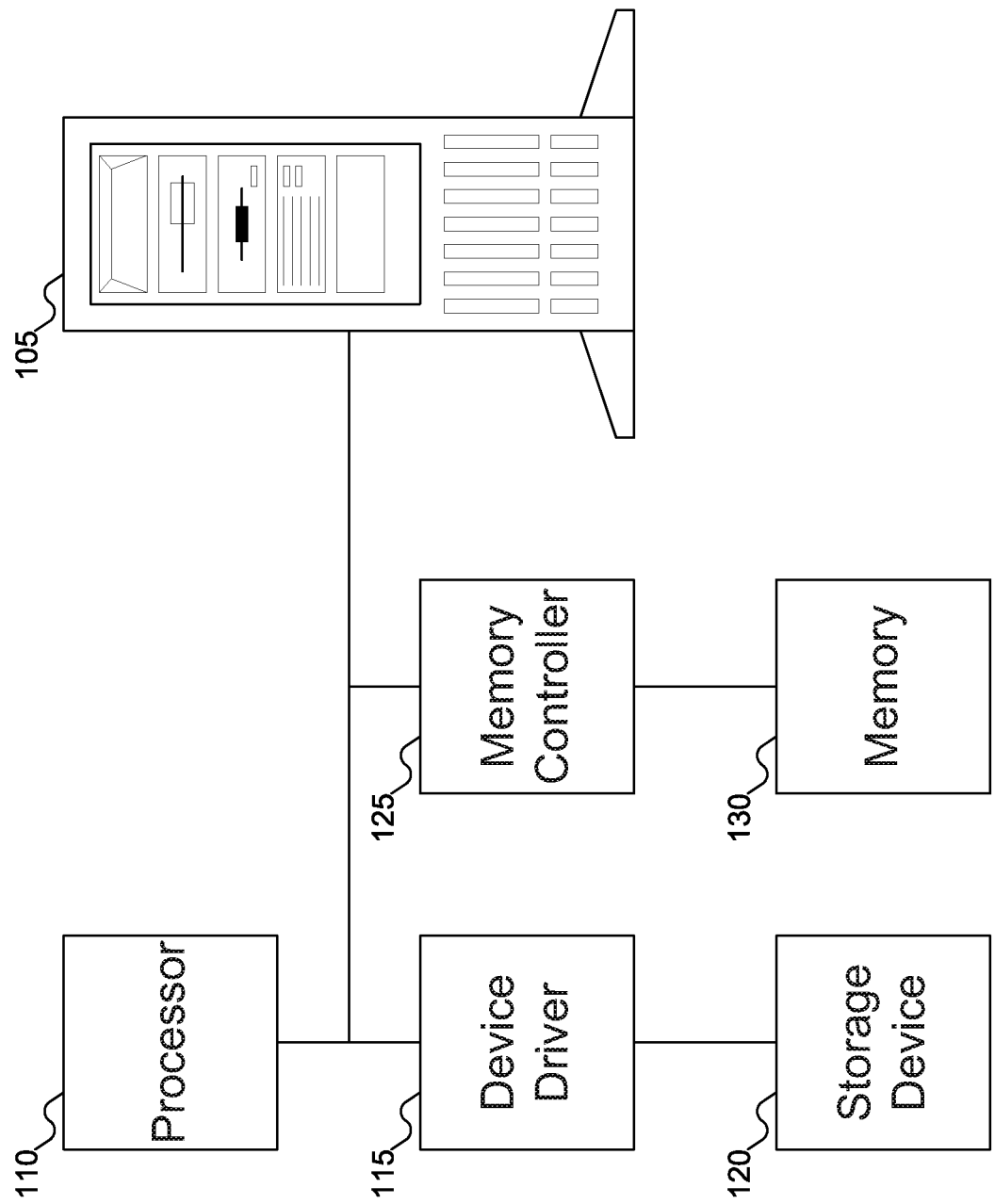
FIG. 1 shows a device supporting isolated Virtual Machine (VM) access to a storage device, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an." and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Presently, early adopters of Single-Root Input/Output Virtualization (SR-IOV) for Non-Volatile Memory Express (NVMe) storage devices have taken the route of providing a finite number of virtual functions (VFs) per physical function (PF) and associated namespaces. The allocation of the logical address space range depends on the namespace allocations, while the bare-metal direct access for VMs depends on the number of supported VFs. This implementation creates problems for a storage device that supports large capacities, since it must support additional hardware at the cost of power and die size to meet the performance demands of directly supporting multiple VMs. At a minimum, supporting SR-IOV functionality requires devices to provide each VF a separate Peripheral Component Interconnect (PCI) config space, I/O bars, I/O queues for submission and completion queues, Message Signaled Interrupts (MSI-X), and doorbell addresses for supported queues.

The deficiency of a fixed allocation approach available in the first SR-IOV storage devices prompted the NVMe committee to develop another specification that removed implementation limitations, such as changing fixed resource allocations to dynamic resource allocations and management. Numerous currently open and active proposed changes are trying to solve resource allocation issues. However, they are bound by physical device limits such as supported VFs adding to the spec complexity that inevitably appears.

Although there are a handful of leading hypervisors in the market such as VMWare, Microsoft, Citrix XenServer, KVM, Qemu, and Oracle VM, only a few from this set are currently actively adopting to market changes. In doing so, they have captured a majority market share. Due to the very nature of their programming environment, each hypervisor environment may be considered a custom implementation. Supporting such implementational variation may therefore be important.

Embodiments of the inventive concept define a simpler mechanism to program SR-IOV storage devices to provide VM isolation and performance. Embodiments of the inventive concept follow a simpler approach by relying on the hypervisor to map resources. Embodiments of the inventive concept may include policies for:

1) Extending performance to a VM by providing direct application access to a VM's I/O queues (a submission and completion queue pair).
2) Directly mapping an I/O queue's (submission and completion queue) capabilities to a VM.
3) Encapsulating controller specifics in the hypervisor for management paths.
4) Dynamically isolating physical resources per individual VM requirements.

Embodiments of the inventive concept may effectively provide SR-IOV-type functionality by adding new NVMe storage device support as a feature.

Embodiments of the inventive concept define the following new features:

1) An advanced management mechanism to remap an NVMe I/O submission queue and I/O completion queue (together known as I/O queue pair) directly to a VM for performance purposes.
2) A mechanism in the hypervisor to implement a virtualized controller that maps hardware I/O queues dynamically to a VM as a set of the virtualized controller.
3) A mechanism to map a logical address space as a logical unit or namespace.
4) A mechanism to map additional I/O queues not available in the storage device using additional methods.
5) A method to provide VM specific isolation for a shared resource.

Embodiments of the inventive concept provide the following advantages over conventional technology:

1) Providing SR-IOV-like functionality without expensive SR-IOV hardware requirements.
2) Providing VMs additional I/O resource isolation and performance benefits that surpass device specifications.
3) Providing hardware ability that may be fully virtualized to avoid operating system (O/S) in-box driver changes.
4) Creates a Quality of Service (QOS) channel between storage devices and a hypervisor.
5) Simplifies hardware requirements for storage virtualization.

Embodiments of the inventive concept provide a mechanism to remap storage device I/O resources directly to VMs. Embodiments of the inventive concept use existing remapping resources for memory and interrupts, including an Input-Output Memory Management Unit (IOMMU) for x86 architectures and additional hardware resources to map to a large number of VMs that the storage device would not normally support.

To achieve these benefits, a storage device, which may include a Solid State Drive (SSD), should:

1) Support extended I/O queue creation properties.
2) Support simple logical address remapping at the I/O queue level.
3) Support doorbells at a O/S page boundary for VM security.
4) Advertise these extended attributes through one or more fields per NVMe specification standards.
5) Optionally provide additional queue priority class arbitration mechanisms than default to apply QoS.

Mapping a NVMe I/O Queue Pair Directly to a VM

An I/O submission queue and I/O completion queue may together be known as an I/O queue pair since they function together and, when resources are limited, will apply a 1:1 mapping automatically. Most (if not all) in-box NVMe drivers create a 1:1 mapping of these queues. Embodiments of the inventive concept target this usage since these are the device driver implementations that run in a VM.

A storage device that supports embodiments of the inventive concept may provide extended I/O creation commands for submission and completion queues. The command may be applied through a separate operational code that may be marked as optional or may be defined as a vendor-specific command. The extended command may support the basic NVMe queue creation command specifics the NVMe specification defines, such as queue size, queue identifier, queue priority class, whether the queue buffer is physically contiguous, interrupt vector, and interrupt-enabled fields. But in addition to these, the extended command may also support logical block addressing offset within the device's address space. The mechanisms work as follows:

1) When a VM is created, the hypervisor exposes a virtualized NVMe storage device in the VM's PCI space. The device may initially be fully virtualized to take guest exits on access to its PCI configuration and I/O memory mapped regions. For interrupts, the hypervisor may setup specific MSI-X interrupts to directly interrupt the guest VM as appropriate per the hypervisor's implementation.
2) In the I/O memory mapped space, the hypervisor may trap any NVMe configuration space changes and virtualizes the access request as appropriate. The hypervisor may expose doorbells as part of the I/O memory at an O/S page level granularity so that the hypervisor may map each doorbell at a VM level. The storage device may also support this feature.
3) When a VM creates an I/O submission queue, the hypervisor traps the request and maps it to a storage device's physical I/O submission queue using the "Extended Create I/O Submission Queue" command. The hypervisor and the storage device may use the values provided by the VM and change/add the following:
   a) Map the queue memory to its physical page(s) so the storage device has direct access to it. This mechanism may be provided by the IOMMU on Intel x86 based architectures.
   b) Add a queue priority, if supported, that prioritizes this queue with respect to other VMs.
   c) Binds a previously created I/O completion queue ID in the VM's space to this submission queue with respect to the storage device I/O queue.
   d) Adds logical block address start and end values that map a part of the physical address space to the VM.
   e) Applies appropriate QoS requirements for either minimum or maximum I/O operations, or minimum or maximum bytes transferred per second granularity.
   f) Additionally, the storage device may provide global namespace access privileges if the VM requires it. These global namespace access privileges may be specified in an array that lists the namespace ids.
   g) Additionally, if the storage device provides such support, the storage device may provide namespace access-type privileges such as read only, read write, exclusive access.
4) The hypervisor may also trap I/O completion queue creation requests and instead:
   a) Map the queue memory to its physical page(s) so that the storage device has direct access to it. On Intel x86 based architectures, the IOMMU may provide this mechanism.
   b) Map the interrupt vector provided between an actual storage device vector and the VM through system architecture mechanisms already in place for virtualization, such as the IOMMU.
5) Depending on managed VM complexity and hypervisor implementation, embodiments of the inventive concept may map multiple I/O creation requests to a single physical queue. If implemented, the FPGA may handle the I/O completion queues and may interrupts back to the VM guest. This mechanism may address the dynamic queue allocation mechanism.
6) In another usage of dynamic queue allocation mechanism, the hypervisor may expose only the require I/O queues based on the VMs Service Level Agreements (SLAs).

Once setup, the hypervisor-aided mechanisms that may map hardware I/O queues dynamically to a VM may provide the necessary isolation and performance benefits similar to those SR-IOV provides, but with lower manufacturing, testing and debugging costs. The hypervisor may also necessitate some changes, but these changes are self-contained and restricted to the available hypervisors, reducing the overall impact. If the storage device is installed in a system that does not support virtualization, the storage device should perform as a regular NVMe storage device.

Managing Address Space Isolation

NVMe may share a single, unique logical address space by using Namespaces which work like Small Computer Systems Interface (SCSI) Logical Unit Numbers (LUNs). Given a Namespace ID, the logical address blocks may be offset with an address where the namespace starts in the full logical address map.

In conventional storage device, the physical address space may be subdivided into logical units by creating namespaces with their co-ordinates. In conventional storage device, this subdivision may require additional Namespace support for creating multiple namespaces. Embodiments of the inventive concept bypass this requirement by attaching the created I/O queue directly to a logical unit space. For example, extended attributes may be defined as part of the I/O queue's logically addressable space, so the default namespace maps to it. This modification aligns each I/O queue, giving a VM direct access to the appropriate space. Typically VMs either request access to only a private namespace or to a shared namespace. The extended attributes in I/O queue creation may specify the default namespace start and end LBAs with respect to the global physical address space. This mechanism addresses hardware Namespace management requirements. Any incoming I/O request must go through an I/O queue. Since the I/O queue already holds the default namespace mapping offset, it may translate the LBA addresses directly using this programmed offset.

If access to multiple namespaces is needed, the extended I/O queue creation may have an additional definition to support global namespace access. For example, I/O queue 23: Global Namespace accessed: 3.

Mechanism to Map Additional I/O Queues not Available in the Storage Device

This mechanism involves the use of additional Field Programmable Gate Array (FPGA) logic that provide the I/O queues in a separate space. Using this mechanism, embodiments of the inventive concept may support significantly more I/O queues that may be mapped directly to VMs. The FPGA may support the NVMe specification or a subset of the specification through which this mechanism is arbitrated.

Full specification support: In this mechanism, the FPGA may fully mimic the NVMe specification and provides full specification-level functionality. The FPGA may provide the memory map for associated I/O queue doorbells at an O/S page granularity, the support for additional I/O queues not available in the device, full MSI-X interrupt support for I/O queues supported, and mapping logical address space per I/O queue. In this mechanism, the storage device need not support the extended I/O queue functionality at all, which may be fully implemented in the additional programmable hardware.

Partial specification support: If the number of VMs may be predicted to be no greater than the number of I/O queues supported by the storage device, part or all of the functionality may be implemented within the storage device. The FPGA may then function as a "pass-through" device for I/O requests by the VM, or using a one-to-one mapping of virtual I/O queues to storage device I/O queues. The FPGA may still be used to reduce the amount of hardware used to implement functionality in the storage device.

In either case, the FPGA logic may provide the necessary isolation granularity to each VM. To provide a large number of I/O queues, the FPGA may map many of its exposed I/O queues to a single storage device I/O queue.

The FPGA may provide the logical address space mapping constructs and the associated namespace-like isolation The FPGA may also provide the necessary MSI-X interrupt mapping capability for this device to be fully functional.

Quality of Service

When multiple VMs perform IO operations that access a single storage device, they inhibit performance due to the blender effect. The storage device does not have access to specific VMs when a device is shared without isolation at the VM level. With SR-IOV, the isolation is provided at the PF mapping level, but the benefits are not advertised or are unknown. Embodiments of the inventive concept may support binding an I/O queue resource to a VM that provides natural isolation—not only at the resource level, but also to the VM I/O requests in flow. The storage device has full VM knowledge by the configuration I/O queue identification. If the storage device supports additional priority class arbitration mechanisms (as defined in the NVMe specification or part of a vendor-specific command), the hypervisor may apply them to the I/O queue at creation time. The hypervisor may choose to apply these different priority class support based on a VM's requirements.

Based on the storage device functionality provided, embodiments of the inventive concept may also expose an additional field in the extended I/O queue creation command that provides a performance limit or minimum service required to apply to the storage device. The performance limit or minimum service required may be quantified in read and write I/O count or bytes transferred. Such a performance limit or minimum service required may also be a settable option based on device support and by the hypervisor to apply to the VM.

Typical usages of embodiments of the inventive concept may apply directly to storage virtualization in the enterprise segment which heavily utilizes virtual machines (VMs).

FIG. 1 shows a device supporting isolated Virtual Machine (VM) access to a storage device, according to an embodiment of the inventive concept. In FIG. 1, device 105, which may also be called a host computer or host device, is shown. Device 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in device 105, device 105 may include any number of processors, each of which may be single core or multi-core processors, and may be mixed in any desired combination. Processor 110 may run device driver 115, which may support access to storage device 120: different device drives may support access to other components of device 105.

Device 105 may also include memory controller 125, which may be used to manage access to main memory 130. Memory 130 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 120 may also be any desired combination of different memory types.

Although FIG. 1 depicts device 105 as a server (which could be either a standalone or a rack server), embodiments of the inventive concept may include device 105 of any desired type without limitation. For example, device 105 could be replaced with a desktop or a laptop computer or any other device that may benefit from embodiments of the inventive concept. Device 105 may also include specialized portable computing devices, tablet computers, smartphones, and other computing devices.

Figure 2:
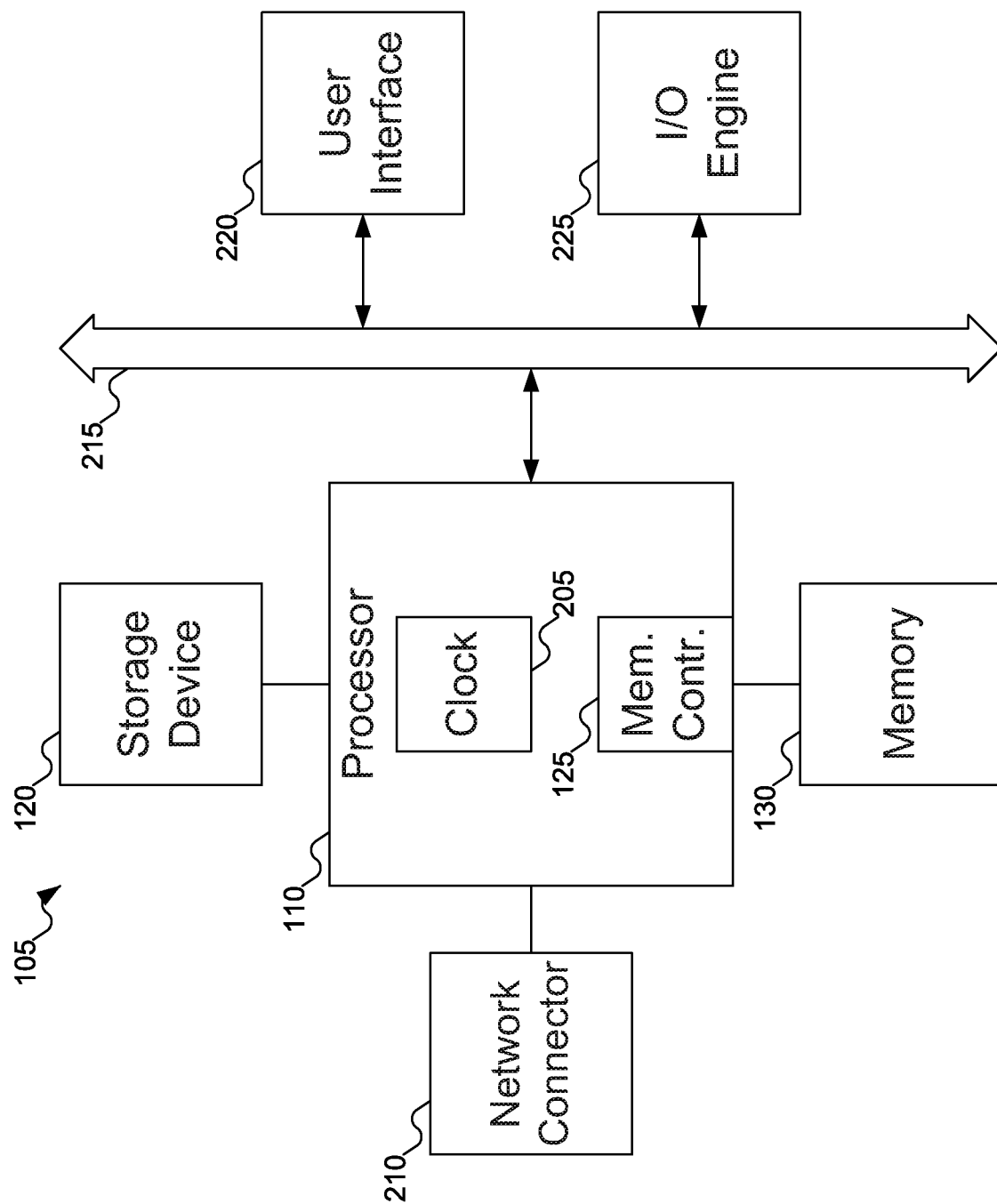
FIG. 2 shows additional details of the device of FIG. 1.

FIG. 2 shows additional details of device 105 of FIG. 1. In FIG. 2, typically, device 105 includes one or more processors 110, which may include memory controllers 125 and clocks 205, which may be used to coordinate the operations of the components of device 105. Processors 110 may also be coupled to memories 130, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
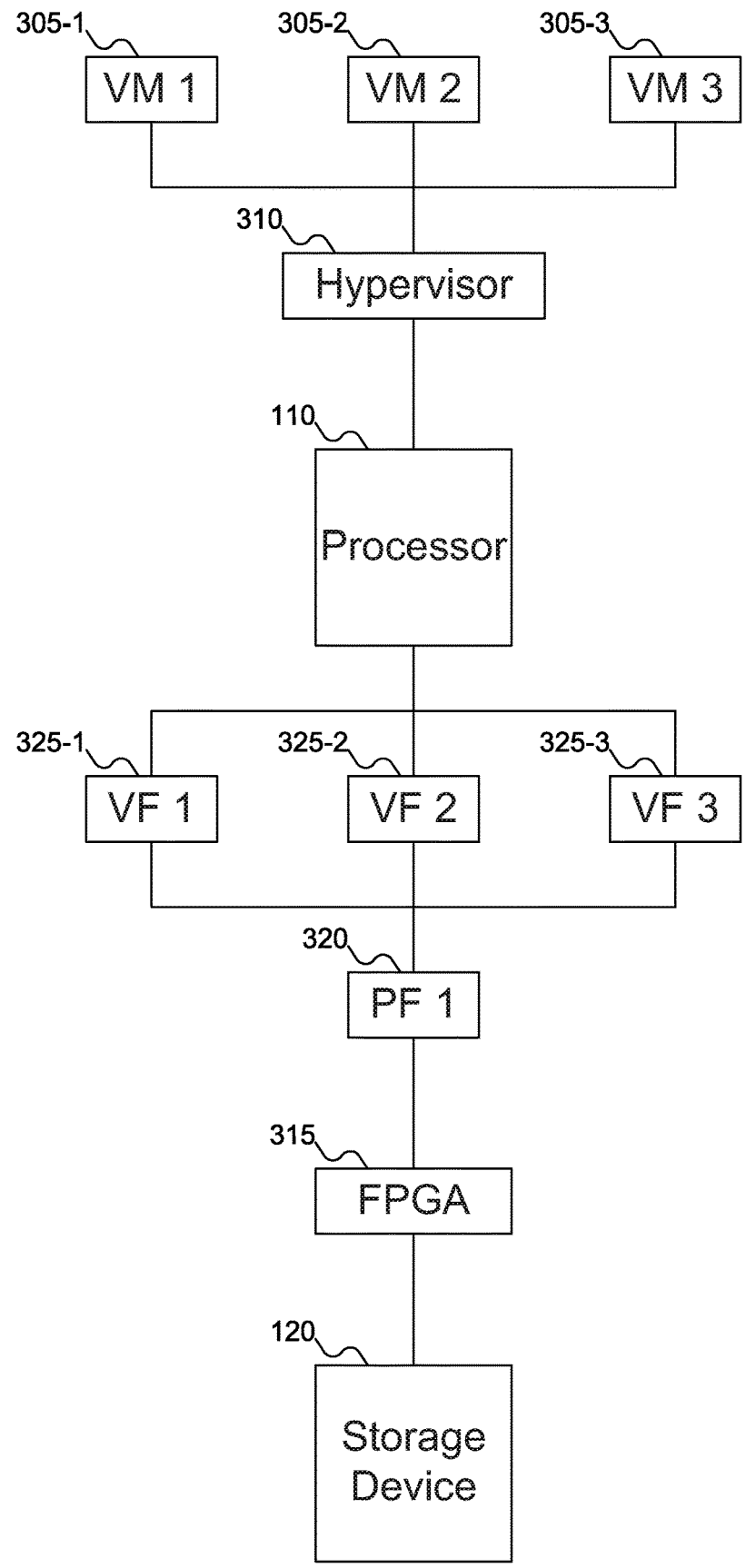
FIG. 3 shows a path of communication between the VMs of FIG. 1 and the storage device of FIG. 1, where the storage device of FIG. 1 exposes only one physical function.

FIG. 3 shows a path of communication between the VMs of FIG. 1 and storage device 120 of FIG. 1, where storage device 120 of FIG. 1 exposes only one physical function. In FIG. 3, three VMs 305-1, 305-2, and 305-3 are shown, which may be instantiated on host device 105 of FIG. 1. While FIG. 3 shows three VMs 305-1, 305-2, and 305-3, embodiments of the inventive concept may include host device 105 of FIG. 1 supporting any number of VMS.

VMs 305-1, 305-2, and 305-3 may communicate with hypervisor 310. Hypervisor 310 may create, manage, and run VMs 305-1, 305-2, and 305-3. Hypervisor 310 is usually implemented as software running on processor 110 of host device 105 of FIG. 1.

To achieve interaction with hardware devices, particularly hardware implementing Single Root Input/Output Virtualization (SR-IOV), such hardware devices may expose various physical functions. For example, FIG. 3 shows Field Programmable Gate Array (FPGA) 315 exposing one physical function (PF) 320.

To enable VMs 305-1, 305-2 and 305-3 to interact with the hardware devices, various virtual functions (VFs) may be exposed as well. Rather than having to interact directly with the hardware, VMs 305-1 305-2, and 305-3 may interact with VFs 325-1, 325-2, and 325-3. VFs 325-1 325-2, and 325-3 offer virtualized versions of PF 320, enabling VMs that use different operating systems (O/Ss) to interact efficiently (for example, using native O/S drivers) with the underlying hardware device. While FIG. 3 shows three VFs for PF 320, embodiments of the inventive concept may include any number of VFs per VF; and if FPGA 315 (or storage device 120) exposes more than one PF, there may be varying numbers of VFs per PF. Each VF exposed may require some hardware support from the underlying device. For example, each VF exposed for storage device 120 may require additional endtraps and doorbells, which require additional hardware implementation.

As noted above, PF 320 may be exposed by FPGA 315, rather than storage device 120, which is the underlying hardware that implements PF 320. FPGA 315 may interrogate storage device 120 to determine which PF(s) are exposed by storage device 120, and then expose comparable PF(s) itself, which may map directly across FPGA 315 to the corresponding PF of storage device 120.

Alternatively, PF 320 may be exposed directly by storage device 120, whereas VFs 325-1, 325-2, and 325-3 may be exposed by FPGA 315. Embodiments of the inventive concept that operate using such implementations may avoid FPGA 315 having to implement in hardware PF functionality already implemented by storage device 120, but complementing that hardware implementation with VFs that may be greater in number than storage device 120 could itself offer.

Regardless of whether storage device 120 or FPGA 315 implements PF 320, FPGA 315 may be interposed between processor 110 (and hypervisor 310) on the one hand and storage device 120 on the other hand. Any communications between hypervisor 310 (and therefore VMs 305-1, 305-2, and 305-3) and storage device 120 would pass through FPGA 315, allowing FPGA 315 to augment the functionality offered by storage device 120 (or potentially to offer SR-IOV-type support for storage device 120 when storage device 120 does not itself offer SR-IOV-type implementation).

In terms of implementation, FPGA 315 may be hardware within storage device 120 (that is, storage device 120 may include FPGA 315 internally to its structure), or FPGA 315 may be additional hardware external to storage device 120 but still along the communication path between processor 110 and storage device 120. For example, FPGA 315 may be implemented as a circuit board installed within host device 105 of FIG. 1 that receives data from a Peripheral Component Interconnect Express (PCIe) bus, with a connection from FPGA 315 to storage device 120. Regardless of how FPGA 315 is implemented, FPGA 315 should be somewhere in between processor 110 and storage device 120, to capture information sent by hypervisor 310 and perform the functionality of FPGA 315.

Hypervisor 310 may trap administrative requests from VMs 305-1, 305-2, and 305-3 to manage their processing. For example, hypervisor 310 may trap information sent to the Peripheral Component Interconnect (PCI) configuration space or requests destined for the administrative queue of storage device 120 and either process them locally, redirect the requests to FPGA 315, or generate new requests that are similar to the original requests (although different in specific ways that depend on the specific requests).

FPGA 315 offers an advantage over implementing SR-IOV functionality within storage device 120 in that FPGA 315 may be programmed on-site as part of the installation process: storage device 120 is usually programmed during manufacture. For example, FPGA 315 might be capable of supporting, say, 100 VFs for a storage device, but at the time of installation the customer might want to expose only, say, 50 VFs (since host device 105 of FIG. 1 might not be capable of supporting that many VMs). FPGA 315 may then be programmed, using conventional techniques, to expose only 50 VFs, leaving the remaining gates unused (and therefore not consuming power). For example, FPGA 315 may be programmed at the time of manufacture with a shell that offers an interface using Non-Volatile Memory Express (NVMe) commands. The customer, after installing FPGA 315 into host device 105 of FIG. 1, may use these NVMe commands to customize FPGA 315 as desired.

FPGA 315 may also be programmed as desired in terms of what parameters may be supported. For example, as discussed below with reference to FIG. 9, there are numerous different variations on QoS requirements. But FPGA 315 might be programmed to consider only bandwidth, and to ignore parameters relating to numbers of I/O requests or numbers of bytes processed per second. The same possibility is true with respect to other parameters of the extended I/O queue creation command.

Figure 4:
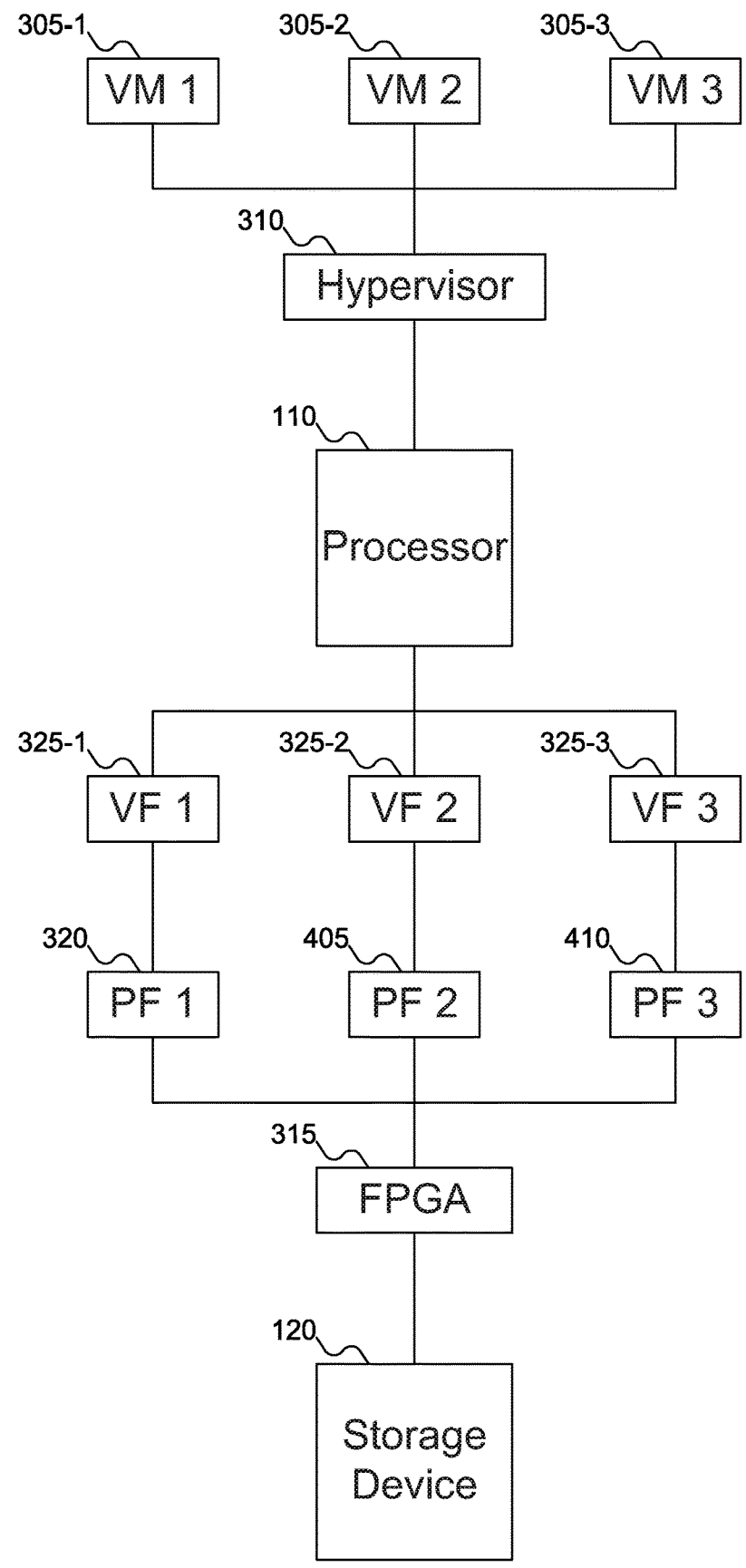
FIG. 4 shows a path of communication between the VMs of FIG. 1 and the storage device of FIG. 1, where the storage device of FIG. 1 exposes multiple physical functions.

FIG. 4 shows a path of communication between the VMs of FIG. 1 and storage device 120 of FIG. 1, where storage device 120 of FIG. 1 exposes multiple physical functions. FIG. 4 is identical to FIG. 3, except that instead of exposing one PF 320, in FIG. 4 three PFs 320, 405, and 410 are exposed, with one VF 325-1, 325-2, and 325-3 exposed for each PF. While FIG. 4 shows FPGA 315 exposing three PFs 320, 405, and 410, embodiments of the inventive concept may support exposing any number of PFs, and any number of VFs 325-1, 325-2, and 325-3 may be exposed for each PF. Multiple PFs might be exposed for any number of reasons: for example, the amount of storage offered by storage device 120 might be too large for a single PF to adequately support. Each PF typically requires some particular hardware support. Therefore, the more PFs are to be exposed, the more hardware is typically required in the underlying device, increasing its die size and power consumption, and potentially decreasing its performance as viewed by a single VM. Each PF may offer different functionality, or multiple PFs may offer the same functionality (enabling a single device to offer support to more than one VM at a time).

In FIGS. 3-4, all of the functionality described herein to offer SR-IOV-type support might be implemented in FPGA 315, or some (or all) might be implemented in storage device 120. For example, in some embodiments of the inventive concept, storage device 120 might be a conventional storage device, offering no built-in support for any SR-IOV-type functionality, with FPGA 315 responsible for all of the SR-IOV-type functionality. In other embodiments of the inventive concept, storage device 120 might offer support for extended I/O queue creation commands (discussed below with reference to FIGS. 5-6), and if storage device 120 includes enough I/O queues to support the expected number of VMS, FPGA 315 might only offer VFs 325-1, 325-2, and 325-3 and manage I/O requests from the VMs as a "pass-through" device. In yet other embodiments of the inventive concept, storage device 120 might offer support for extended I/O queue creation commands, but because the number of VMs is expected to exceed the number of I/O queues of storage device 120, FPGA 315 might still manage I/O queue creation internally: storage device 120 might then be treated as a conventional storage device despite supporting the extended I/O queue creation command.

Figure 5:
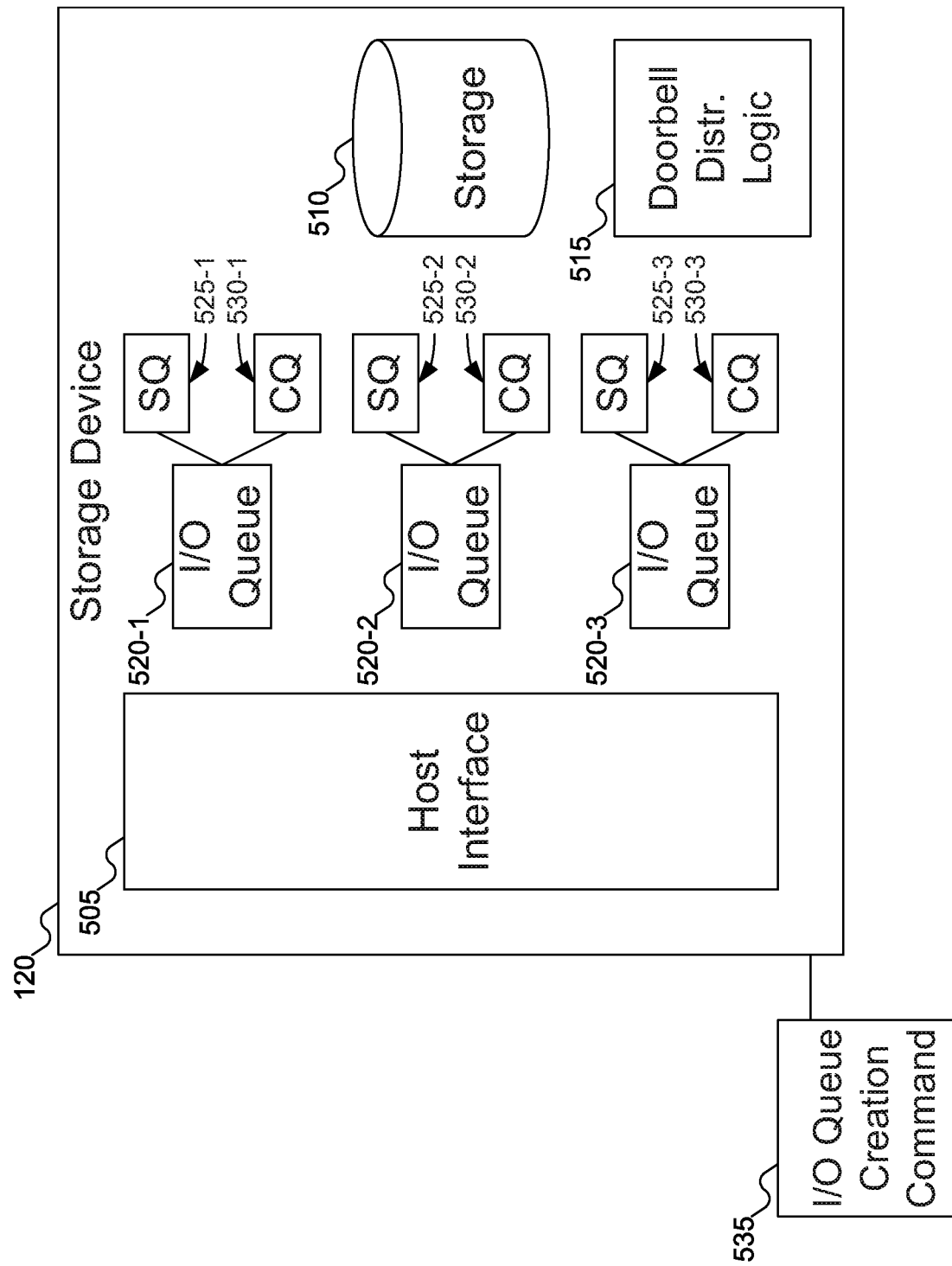
FIG. 5 shows details of the storage device of FIG. 1.

FIG. 5 shows details of storage device 120 of FIG. 1. In FIG. 5, storage device 120 may include host interface 505, which manages communications with host device 105 of FIG. 1. Storage device 120 may also include storage 510, which stores the actual data being accessed by VMs 305-1, 305-2, and 305-3 of FIG. 3. Storage 510 may take any desired form: for example, if storage device 120 is a Solid State Drive (SSD), then storage 510 may take the form of flash memory, whereas if storage device 120 is a hard disk drive, then storage 510 may take the form of disks. Storage device 120 may also include doorbell distribution logic 515, which may distribute doorbells across the internal memory of storage device 120 so that each doorbell is located in a different page of the internal memory (where the size of the page may be determined from the page size of memory 130 of FIG. 1). By placing doorbells in different pages, different VMs access different pages to access their doorbell(s), avoiding the possibility that multiple VMs might need to access the same memory page to access their doorbells (which would go against the objective of VM isolation). And while FIG. 5 shows doorbell distribution logic 515 as part of storage device 120, embodiments of the inventive concept may place doorbell distribution logic 515 in FPGA 315 of FIG. 3 as well. Doorbell distribution is discussed further with reference to FIG. 8 below.

FIG. 5 does not show other conventional hardware and/or circuitry that might be included in storage device 120, such as a Flash Translation Layer (FTL) and read/write circuitry for an SSD or read/write heads for a hard disk drive. Nor does FIG. 5 show additional optional components that might be included in storage device 120, such as a cache. Embodiments of the inventive concept extend to include all such conventional components.

Storage device 120 may use any desired interface for communicating with host device 105 of FIG. 1. For example, storage device 120 may use an NVMe interface, or storage device 120 may use a Serial AT Attachment interface. Similarly, storage device 120 may use any desired connection mechanism for connecting to host device 105, including, for example, PCI or PCIe (using 4, 8, or any other number of PCI lanes), M.2, and SATA, among other possibilities. Embodiments of the inventive concept are intended to include all variations on connection and interface.

Storage device 120 may also include I/O queues (also called I/O queue pairs) that may be used for request submission and response return: a submission queue may be used by VM 305-1 of FIG. 3 to submit an I/O request (such as a read or write request), and a completion queue may be used by storage device 120 to return a result to VM 305-1 of FIG. 3. In FIG. 5, storage device is shown including three I/O queues 520-1, 520-2 and 520-3, with submission queues 525-1, 525-2 and 525-3 respectively and completion queues 530-1, 530-2 and 530-3, respectively. While FIG. 5 suggests that each submission queue 520-1, 520-2 and 520-3 has a corresponding completion queue 525-1, 525-2, and 525-3, embodiments of the inventive concept may support a single completion queue including results from multiple submission queues.

Storage device 120 may include circuitry to support I/O queue creation command 535 that may be offered by storage device 120. Using I/O queue creation command 535, hypervisor 310 of FIG. 3, or FPGA 315 of FIG. 3, may request that an I/O queue be established for use. But while conventional storage devices, such as those supporting the NVMe interface, may offer a standardized form of I/O queue creation command 535, I/O queue creation command 535 as shown represents an extended I/O queue creation command, offering additional attributes not offered or supported by conventional I/O queue creation commands.

Figure 6:
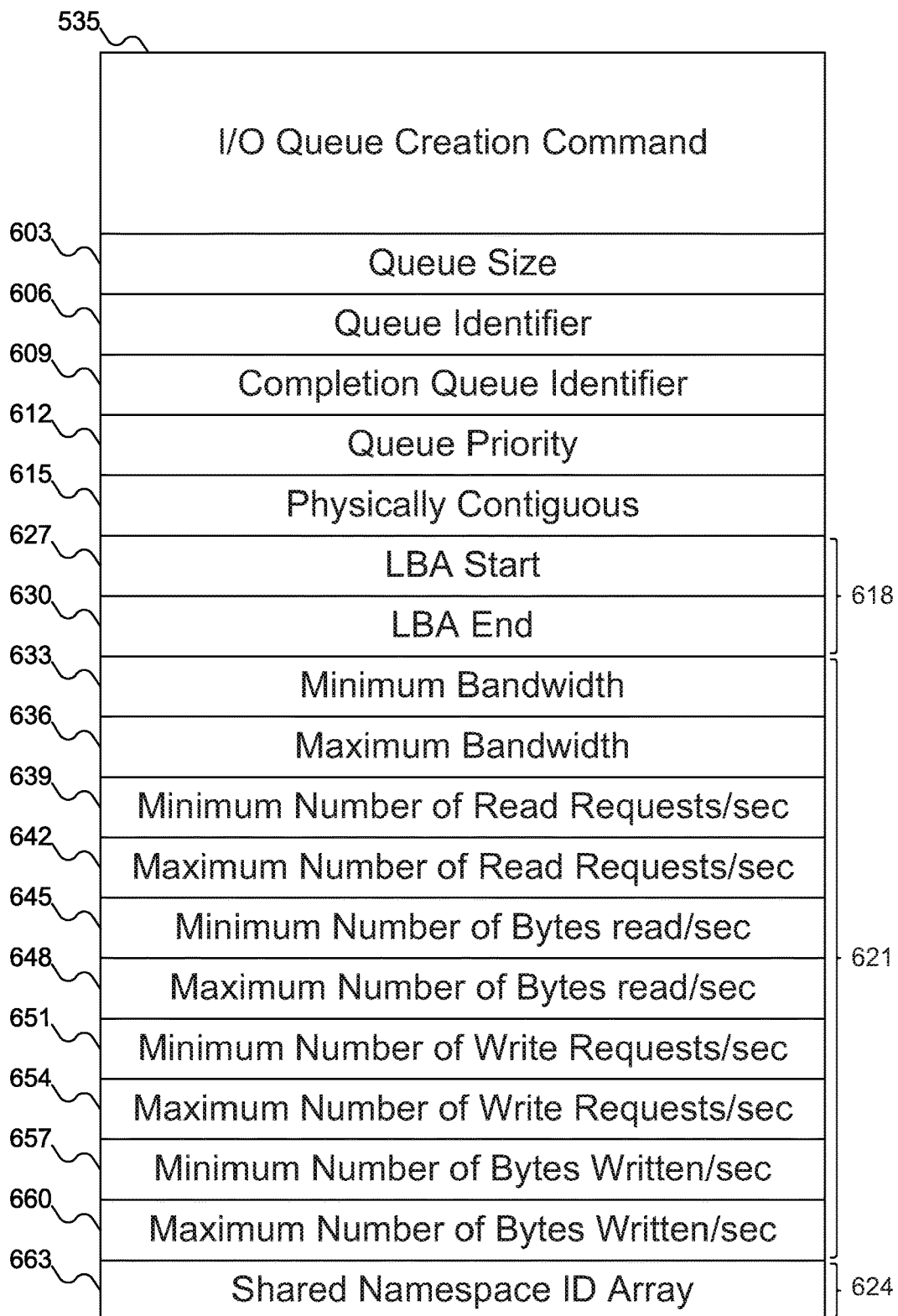
FIG. 6 shows an extended I/O queue creation command for the storage device of FIG. 1.

FIG. 6 shows extended I/O queue creation command 535 of FIG. 5 for storage device 120 of FIG. 1. In FIG. 6, I/O queue creation command 535 is shown. I/O queue creation command 535 may include parameters that are part of the conventional NVMe specification-defined I/O queue creation command, such as queue size 603 (how much space should be allocated for the queue being established), queue identifier 606 (an identifier for the submission queue being established), completion queue identifier 609 (an identifier for the completion queue), queue priority 612 (the relative priority of the submission queue being established), and physically contiguous flag 615 (indicating whether the submission queue and the completion queue are to be physically contiguous or not). But in addition, I/O queue creation command 535 may include other attributes. These attributes include Logical Block Address (LBA) range attribute 618, Quality of Service (QOS) attribute 621, and shared namespace attribute 624. LBA range attribute 618 may specify a range of LBAs associated with VM 305-1. Using LBA range attribute 618, FPGA 315 of FIG. 3 or storage device 120 of FIG. 1 may allocate a portion of the Physical Block Addresses (PBAs) on storage device 120 of FIG. 1 for use by that VM, and not to be used by other VMs (although an exception to this rule is discussed below). By isolating a range of LBAs and a corresponding range of PBAs, VM isolation may be provided.

Figure 7:
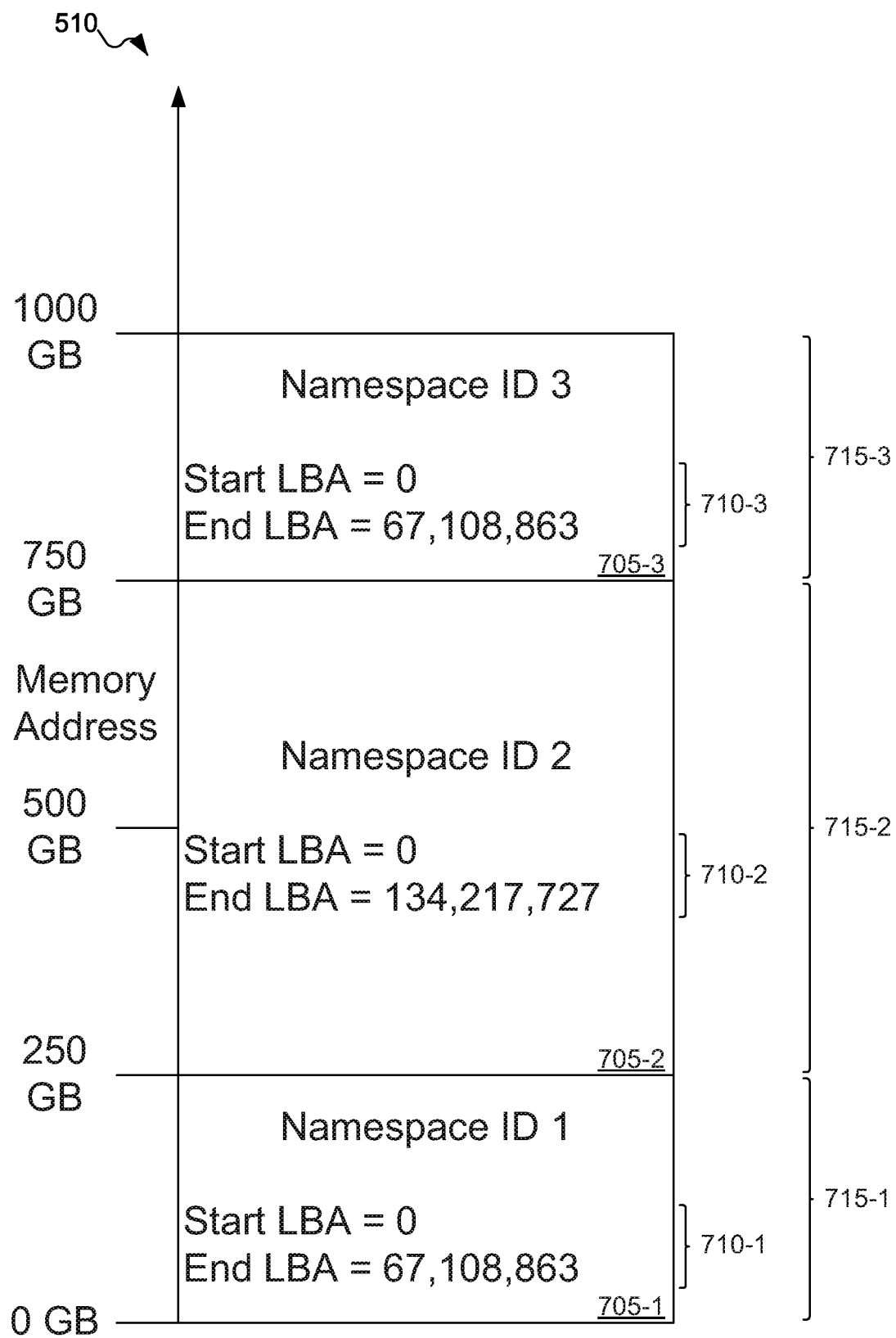
FIG. 7 shows the physical storage of the storage device of FIG. 1 divided into multiple namespaces.

FIG. 7 shows an example of how the physical storage of storage device 3130 of FIG. 1 divided into multiple namespaces. In FIG. 7, 1 TB of storage 510 of FIG. 5 is shown, although embodiments of the inventive concept may support storage devices with any overall capacity. This 1 TB of storage 510 of FIG. 5 is shown divided into three namespaces 705-1, 705-2, and 705-3, but embodiments of the inventive concept may divide storage 510 of FIG. 5 into any number of namespaces.

Each namespace has an associated range of LBAs. Thus, namespace 705-1 includes range of LBAs 710-1, namespace 705-2 includes range of LBAs 710-2, and namespace 705-3 includes range of LBAs 710-3. Corresponding to each range of LBAs 710-1, 710-2 and 710-3, ranges of PBAs 715-1, 715-2, and 715-3 may be established in storage 510 of FIG. 5. Each range of PBAs 715-1, 715-2, and 715-3 should be at least as large as the corresponding range of LBAs, so that every LBA in a given range of LBAs has a corresponding PBA. Note that the LBAs and PBAs do not need to be coincidental: for example, range of LBAs 710-2 ranges from a starting LBA of 0 to an ending LBA of 134,217,727 (which may be, for example, block addresses, with each block including 4096 bytes of data: this block address would correspond with byte address 549,755,813,887), whereas range of PBAs 715-2 ranges from a starting PBA of 67,108, 864 (a byte address of 274,877,906,944) to an ending PBA of 201,326,591 (a byte address of 824,633,720,831).

One advantage of mapping LBA ranges to PBAs and associating one (or both) of those ranges with I/O queues is that such a mapping may avoid the blender effect. The blender effect is a consequence of how conventional storage devices process I/O requests. While I/O requests are still within the I/O queues, the I/O requests have some residual context. But once an I/O request has reached the FTL, any such context has been lost: all I/O requests look the same at that point. As a result, storage device 120 of FIG. 1 would not be able to guarantee QoS requirements for a particular VM. But if the PBA may be tied back to a particular I/O queue via the LBA-PBA mapping (which is itself reversible), the QoS requirements of that I/O queue may still be located and satisfied by storage device 120 of FIG. 1.

It is worth noting that each namespace 705-1, 705-2, and 705-3 has its own namespace identifier (ID). In some embodiments of the inventive concept, these namespace IDs may correspond to the queue identifiers provided as queue identifier 606 of FIG. 6.

Returning to FIG. 6, LBA range attribute 618 may be expressed in a number of ways. For example, LBA range attribute 618 may include LBA start 627 and LBA end 630, which provide the starting and ending addresses for the LBAs in range of LBAs 710-1, 710-2, and 710-3 of FIG. 7. Alternatively, given LBA start 627 and queue size 603, it may be possible to infer LBA end 630, which would permit LBA end 630 to be omitted. The structure of extended I/O queue creation command 535 may be established to support whichever variation on LBA range attribute 618 is desired, including and/or omitting parameters as appropriate.

QoS attribute 621 may represent any desired QoS provisions. For example, the queue being established by I/O queue creation command 535 may be associated with a VM that has a Service Level Agreement (SLA), which attempts to guarantee a particular level of service for the user of the VM. QoS attribute 621 may be expressed using any desired form. Some example forms shown in FIG. 6 include minimum guaranteed bandwidth 633, maximum guaranteed bandwidth 636, minimum number of read requests per second 639, maximum number of read requests per second 642, minimum number of bytes read per second 645, maximum number of bytes read per second 648, minimum number of write requests per second 651, maximum number of write requests per second 654, minimum number of bytes written per second 657, and maximum number of bytes written per second 660. Note that conventional SR-IOV solutions rely on hypervisor 310 of FIG. 3 to manage QoS requirements; embodiments of the inventive concept may shift this management to FPGA 315 of FIG. 3 or storage device 120 of FIG. 1, reducing the load on hypervisor 310 of FIG. 3 and the host CPU load, and thereby improving overall system performance. The structure of extended I/O queue creation command 535 may be established to support whichever variation on QoS attribute 621 is desired, including and/or omitting parameters as appropriate.

Finally, shared namespace attribute 624 may represent a list of namespaces that are intended to share access to the physical storage for the VM requesting the creation of the I/O queue. The concept of the shared namespace attribute represents the exception to the concept of VM isolation: virtual machines may not be isolated if they are sharing access to a common dataset. But as there may be situations where multiple VMs need to share information and it is more efficient for them to share access to a common dataset than to message data between the VMs, shared namespace attribute 624 offers this workaround. Shared namespace attribute 624 may be implemented in any desired manner: one example is for I/O queue creation command 535 to include shared namespace ID array 663, which lists the namespace IDs of the VMs that are to have shared access to the dataset.

Figure 8:
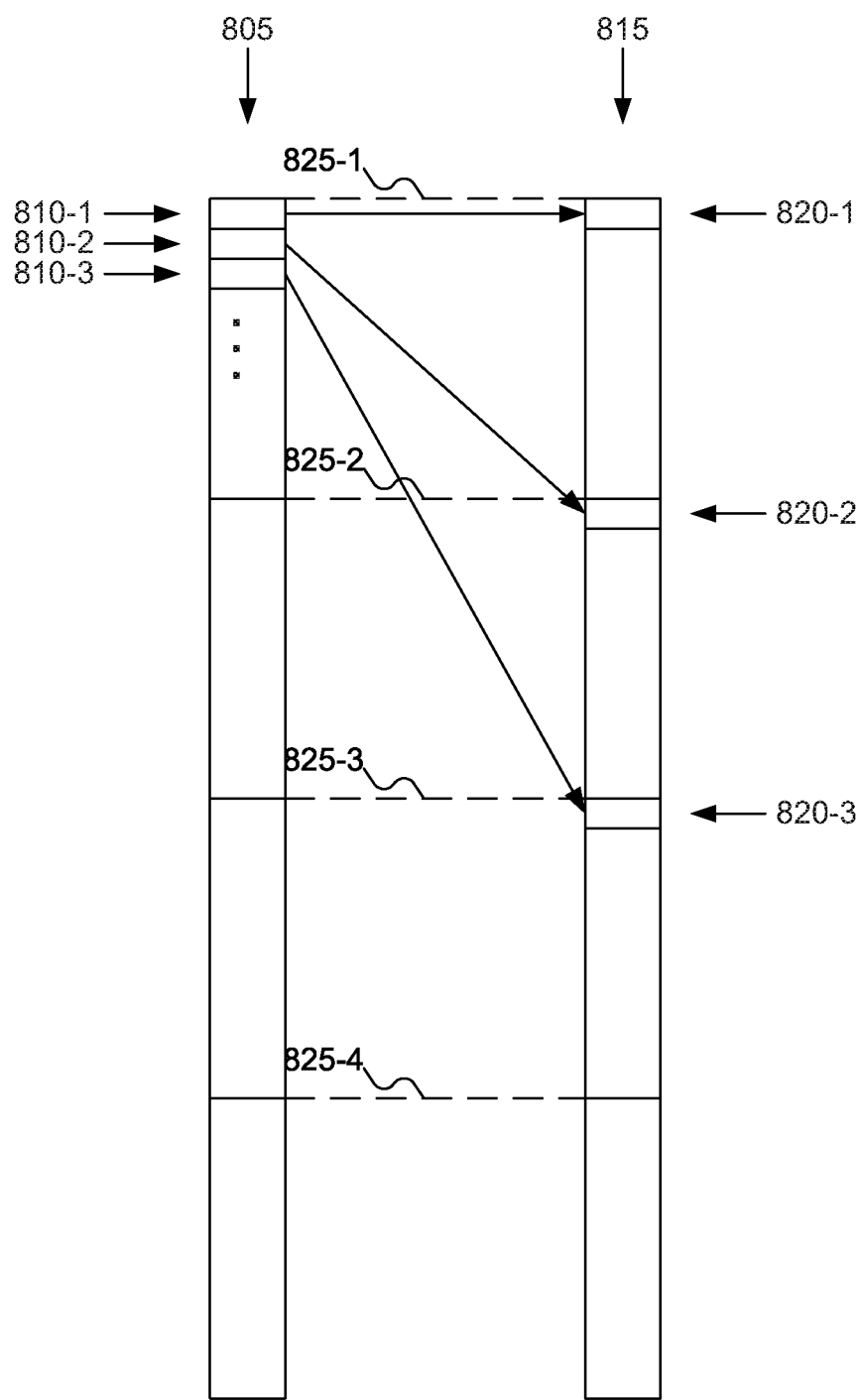
FIG. 8 shows memory mapping of doorbells in the storage device of FIG. 1 to support VM isolation.

FIG. 8 shows memory mapping of doorbells in storage device 120 of FIG. 1 to support VM isolation. In conventional storage devices that use doorbells to communicate between host device 105 of FIG. 1 and storage device 120 of FIG. 1, there may be multiple doorbells: for example, one for each of I/O queues 520-1, 520-2 and 520-3 of FIG. 5. To support access to these doorbells by VMs 305-1, 305-2, and 305-3, storage device 120 of FIG. 1 may request that a portion of the address space of host device 105 of FIG. 1 be allocated to storage device 120. The addresses in the address space of host device 105 of FIG. 1 may then be mapped to the memory addresses of storage device 105. Hypervisor 310 of FIG. 3 may then provide the addresses for the doorbells to VMs 305-1, 305-2, and 305-3 of FIG. 3, enabling VMs 305-1, 305-2, and 305-3 of FIG. 3 to access the doorbells by using the addresses in the address space of host device 105 of FIG. 1.

But in conventional implementations of storage device 120 of FIG. 1, these doorbells may reside in a contiguous section of memory: FIG. 8 illustrates this. In FIG. 8, memory 805 is shown, which represents memory within storage device 120 of FIG. 1 or FPGA 315 of FIG. 3. Memory addresses 810-1, 810-2, and 810-3 for the doorbells of I/O queues 520-1, 520-2, and 520-3 of FIG. 5 are shown occupying a contiguous section of memory, and all lie within a single page of memory 805. While FIG. 8 shows three doorbells occupying memory addresses 810-1, 810-2, and 810-3, embodiments of the inventive concept may include any number of doorbells. In situations where host device 105 of FIG. 1 operates as a single device (without virtualization), this arrangement works fine. But where host device 105 of FIG. 1 supports multiple virtual machines that require isolation, having all the doorbells reside in the same page of memory 805 means that the VMs must share access to the same page of memory, defeating the requirement of VM isolation.

To address this difficulty, storage device 120 of FIG. 1 or FPGA 315 of FIG. 3, depending on which device offers the doorbells, may locate doorbell memory addresses in different pages of memory 130 of FIG. 1, as shown in memory 815. An example of how storage device 120 of FIG. 1 or FPGA 315 of FIG. 3 might locate doorbell memory addresses in different pages is shown in U.S. patent application Ser. No. 14/862,145, filed Sep. 22, 2015, now pending, which has been published as U.S. Patent Publication No. 2016/0306580, which is hereby incorporated by reference. By using a doorbell stride value, doorbell memory addresses may be shifted so that each doorbell is located in a different page of storage device 120 of FIG. 1 or FPGA 315 of FIG. 3 (in this context, the term "different page" is intended to describe a spacing so that the corresponding doorbell addresses in the address space of host device 105 of FIG. 1 are located in different pages based on the size of pages in the O/S memory). Then, since the doorbells are located in different pages in storage device 120 of FIG. 1 or FPGA 315 of FIG. 3, the corresponding addresses in the address space of host device 105 of FIG. 1 are also located in different pages of the O/S memory. Thus, for example, memory address 810-1 may map to memory address 820-1, memory address 810-2 may map to memory address 820-2, memory address 810-3 may map to memory address 820-3, and so on. Since pages 825-1, 825-2, 825-3, and 825-4 may represent different pages of memory, after this mapping each doorbell may reside in a different page of memory 815. As a result, VMs do not share access to a single page of memory 130 of FIG. 1 to access the doorbells, supporting VM isolation.

In FIGS. 5-7, the description centers on storage device 120 of FIG. 1 offering extended I/O queue creation command 535 of FIG. 5, and storage device 120 of FIG. 1 enabling VM isolation. While storage device 120 of FIG. 1 might include the necessary hardware to support VM isolation, not every storage device necessarily includes this hardware. But by including FPGA 315 of FIG. 3 in the system, embodiments of the inventive concept may support VM isolation and SR-IOV-type access to storage device 120 of FIG. 1 even when storage device 120 of FIG. 1 does not include the hardware necessary for SR-IOV. Further, including FPGA 315 of FIG. 3 in the system may enhance the functionality of storage device 120 of FIG. 1 even when storage device 120 of FIG. 1 supports SR-IOV natively.

First, FPGA 315 may include the necessary hardware to support VM isolation. Referring back to FIG. 3, since every request that would be sent to storage device 120 of FIG. 1 may pass through FPGA 315 of FIG. 3, FPGA 315 may intercept requests intended to be received by storage device 120 of FIG. 1. For example, if storage device 120 of FIG. 1 does not support extended I/O queue creation command 535 of FIG. 5, FPGA 315 of FIG. 3 may intercept any such requests and handle I/O queue creation itself. FPGA 315 of FIG. 3 may send a conventional I/O queue creation command to storage device 120 of FIG. 1 while managing VM isolation itself, providing QoS guarantees, and sharing namespaces where appropriate. To that end, FPGA 315 of FIG. 3 may include hardware similar to what might otherwise be included in storage device 120 of FIG. 1. FPGA 315 of FIG. 3 may determine whether a particular I/O request in an I/O queue is within range of LBAs 710 associated with that I/O queue (or part of a shared namespace). FPGA 315 of FIG. 3 may organize and order I/O requests to be sent to storage device 120 of FIG. 1 so that QoS guarantees are provided.

Figure 9:
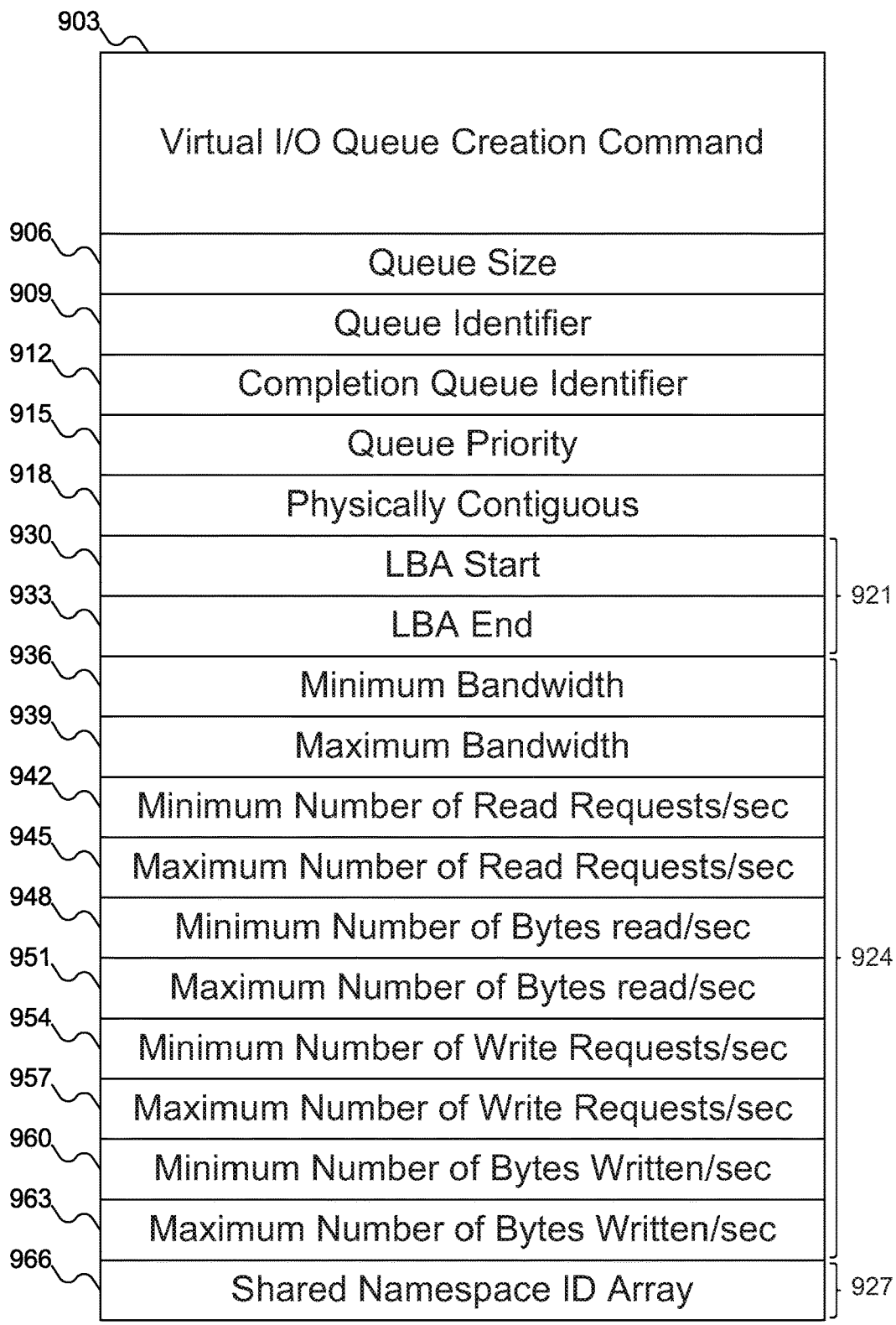
FIG. 9 shows an extended virtual I/O queue creation command for the Field Programmable Gate Array (FPGA) of FIG. 3.

To support I/O queue creation and VM isolation, FPGA 315 of FIG. 3 may include virtual I/O queue creation command 903, as shown in FIG. 9. Virtual I/O queue creation command 903 is very similar to I/O queue creation command 535 of FIG. 6, and includes similar parameters and attributes. The primary difference is that whereas I/O queue creation command 535 of FIG. 6 is intended to be processed by storage device 120 of FIG. 1 (although, as mentioned above, FPGA 315 of FIG. 3 may intercept I/O queue creation command 535 of FIG. 6 and process it internally instead), virtual I/O queue creation command 903 is directed toward FPGA 315 of FIG. 3, and is not intended to be processed by storage device 120 of FIG. 1.

Because virtual I/O queue creation command 903 is intended to achieve a result similar to I/O queue creation command 535, virtual I/O queue creation command 903 may include similar attributes/parameters to those of I/O queue creation command 535 of FIG. 9. Thus, virtual I/O queue creation command may include parameters that are part of the conventional I/O queue creation command, such as queue size 906 (how much space should be allocated for the queue being established), queue identifier 909 (an identifier for the submission queue being established), completion queue identifier 912 (an identifier for the completion queue), queue priority 915 (the relative priority of the submission queue being established), and physically contiguous flag 918 (indicating whether the submission queue and the completion queue are to be physically contiguous or not). Virtual I/O queue creation command 903 may also include extended attributes, such as LBA range attribute 921, QoS attribute 924, and shared namespace attribute 927.

Like with I/O queue creation command 535 of FIG. 5, LBA range attribute 921 may be expressed in a number of ways. For example, LBA range attribute 921 may include LBA start 930 and LBA end 933, which provide the starting and ending addresses for the LBAs in range of LBAs 710-1, 710-2, and 710-3 of FIG. 7. Alternatively, given LBA start 930 and queue size 906, it may be possible to infer LBA end 933, which would permit LBA end 933 to be omitted. The structure of extended virtual I/O queue creation command 903 may be established to support whichever variation on LBA range attribute 921 is desired, including and/or omitting parameters as appropriate.

Similarly, QoS attribute 924 may represent any desired QoS provisions. For example, the queue being established by virtual I/O queue creation command 903 may be associated with a VM that has an SLA, which attempts to guarantee a particular level of service for the user of the VM. QoS attribute 924 may be expressed using any desired form. Some example forms shown in FIG. 9 include minimum guaranteed bandwidth 936, maximum guaranteed bandwidth 939, minimum number of read requests per second 942, maximum number of read requests per second 945, minimum number of bytes read per second 948, maximum number of bytes read per second 951, minimum number of write requests per second 954, maximum number of write requests per second 957, minimum number of bytes written per second 960, and maximum number of bytes written per second 963. The structure of extended virtual I/O queue creation command 903 may be established to support whichever variation on QoS attribute 924 is desired, including and/or omitting parameters as appropriate.

Finally, shared namespace attribute 927 may represent a list of namespaces that are intended to share access to the physical storage for the VM requesting the creation of the I/O queue. The concept of the shared namespace attribute represents the exception to the concept of VM isolation: virtual machines may not be isolated if they are sharing access to a common dataset. But as there may be situations where multiple VMs need to share information and it is more efficient for them to share access to a common dataset than to message data between the VMs, shared namespace attribute 927 offers this workaround. Shared namespace attribute 927 may be implemented in any desired manner: one example is for virtual I/O queue creation command 903 to include shared namespace ID array 966, which lists the namespace IDs of the VMs that are to have shared access to the dataset.

Note that in some embodiments of the inventive concept, storage device 120 of FIG. 1 may include I/O queue creation command 535 of FIG. 6, and therefore may support I/O queues being created and assigned to VMs 305-1, 305-2, and 305-3. In such embodiments of the inventive concept, FPGA 315 of FIG. 3 may simply take virtual I/O queue creation command 903 and send it on to storage device 120 of FIG. 1 as I/O queue creation command 535 of FIG. 5, rather than processing virtual I/O queue creation command 903 to create a virtual I/O queue in FPGA 315 of FIG. 3.

But FPGA 315 of FIG. 3 may do more than just offload the hardware that supports SR-IOV-type operations (permitting FPGA 315 of FIG. 3 to be used with storage devices that do not include the SR-IOV-type hardware themselves). FPGA 315 of FIG. 3 may also extend the number of I/O queues "offered by" storage device 120 of FIG. 1. Since each VM on host device 105 of FIG. 7 requires its own access to storage device 120 of FIG. 1, each VM on host device 105 of FIG. 1 requires access to its own VF and I/O queue on storage device 120 of FIG. 1. But the number of VFs and I/O queues supported by storage device 120 of FIG. 1 may represent an upper bound on the number of VMs that might access storage device 120 of FIG. 1 at any point in time. This upper bound is likely far lower than the number of VMs hypervisor 310 of FIG. 3 (and processor 110 of FIG. 1) may support, which means that either VMs would be left without access to storage device 120 of FIG. 1 or resources of host device 105 of FIG. 1 would be left unused.

Figure 10:
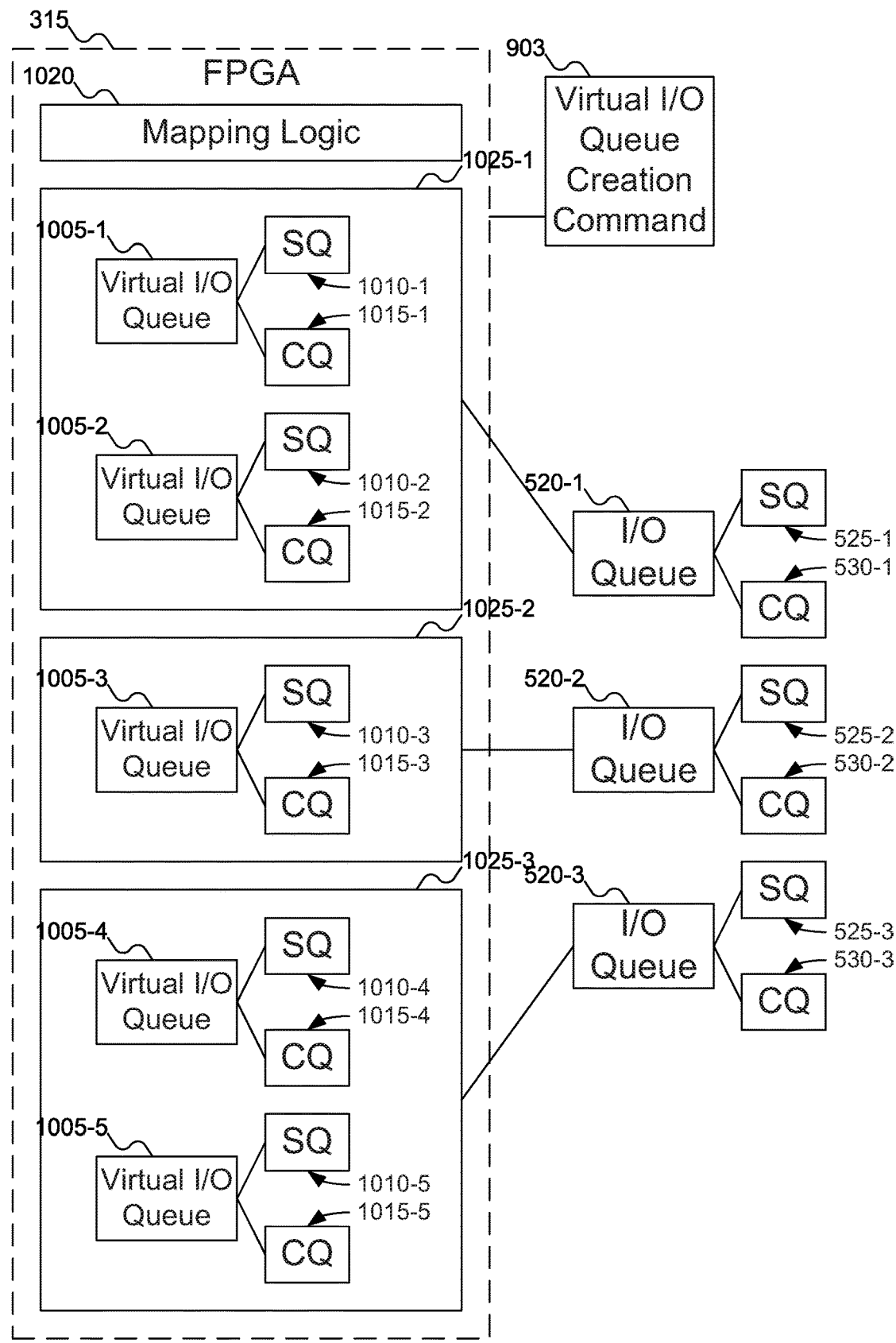
FIG. 10 shows the FPGA of FIG. 3 supporting virtual I/O queues that map to I/O queues in the storage device of FIG. 1.

FPGA 315 of FIG. 3 may solve this problem by providing additional virtual I/O queues, which may number far higher than the number of I/O queues (and PFs/VFs) offered directly by storage device 120 of FIG. 1. FIG. 10 illustrates this situation.

In FIG. 10, assume that I/O queues 520-1, 520-2 and 520-3 represented the only I/O queues offered by storage device 120 of FIG. 1 (in practice the number of I/O queues is larger than three, but still generally smaller than the number of VMs that host device 105 of FIG. 1 may support simultaneously). If host device 105 of FIG. 1 is running more than three VMs, then one or more VMs would be left without an available I/O queue if storage device 120 of FIG. 1 were the only source of I/O queues. But with FPGA 315 supporting virtual I/O queues, these additional VMs may still have access to storage device 120 of FIG. 1.

When hypervisor 310 of FIG. 3 issues virtual I/O queue creation command 903 offered by FPGA 315, FPGA 315 may establish a new virtual I/O queue. FIG. 10 shows five virtual I/O queues 1005-1, 1005-2, 1005-3, 1005-4, and 1005-5 but FPGA 315 may support any number of virtual I/O queues (the limit being bounded by the number of gates in FPGA 315). Each virtual I/O queue includes its own submission and completion queues. Thus, virtual I/O queues 1005-1, 1005-2, 1005-3, 1005-4, and 1005-5 includes submission queues 1010-1, 1010-2, 1010-3 1010-4, and 1010-5 respectively, along with completion queues 1015-1, 1015-2, 1015-3, 1015-4, and 1015-5, respectively.

Each virtual I/O queue may then be associated with a (hardware) I/O queue of storage device 120 of FIG. 1. FPGA 315 may use mapping logic 1020, which may use any desired approach for organizing virtual I/O queues 1005-1 through 1005-5 into groups and mapping them to (hardware) I/O queues 520-1, 520-2, and 520-3. For example, in FIG. 10 mapping logic 1020 may select virtual I/O queues 1005-1 and 1005-2 to form group 1025-1, which is associated with I/O queue 520-1, virtual I/O queue 1005-3 (by itself) to form group 1025-2, which is associated with I/O queue 520-2, and virtual I/O queues 1005-4 and 1005-5 to form group 1025-3, which is associated with I/O queue 520-3. Thus, any I/O requests FPGA 315 receives from VMs 305-1, 305-2, and 305-3 of FIG. 3 may be "placed" in the appropriate virtual submission queue, then passed to the correct (hardware) submission queue of storage device 120 of FIG. 1. Similarly, responses received from a (hardware) completion queue may be "placed" in the correct virtual completion queue and "returned" to the appropriate VM.

Mapping logic 1020 may use any desired approach for organizing virtual I/O queues 1005-1 through 1005-5 into groups, with each group associated with a particular (hardware) I/O queue. For example, mapping logic 1020 might assign virtual I/O queues to groups randomly. Or, mapping logic 1020 might assign virtual I/O queues to groups in a round-robin manner: the first virtual I/O queue assigned to the first group, the second virtual I/O queue to the second group, and so on until all groups have one virtual I/O queue, after which virtual I/O queues are assigned to groups starting again with the first group. Or, mapping logic 1020 might assign virtual I/O queues to groups based on the expected I/O loads of VMs 305-1, 305-2, and 305-3 of FIG. 3, to attempt to balance the I/O loads across the groups. Or, mapping logic 1020 might assign virtual I/O queues to groups based on the relative priorities specified for VMs 305-1, 305-2, and 305-3 of FIG. 3 (note that queue priority 612 of FIG. 6 is part of the conventional NVMe specification-defined I/O queue creation command, and queue priority 915 of FIG. 9 is part of virtual I/O queue creation command 903 of FIG. 9). Or, mapping logic 1020 might assign virtual I/O queues to groups based on QoS attribute 924 of FIG. 9, in an attempt to satisfy the QoS requirements of VMs 305-1, 305-2, and 305-3. Embodiments of the inventive concept may also employ other methodologies in determining which virtual I/O queues to assign to which groups.

Since FPGA 315 knows which LBAs are associated with each virtual I/O queue (via LBA range attribute 921 of FIG. 9 and/or shared namespace attribute 927 of FIG. 9), FPGA 315 may enforce VM isolation by rejecting I/O requests that are not appropriate to that virtual I/O queue. Similarly, because FPGA 315 knows the QoS requirements of the VM (via QoS attribute 924 of FIG. 9), FPGA 315 may forward I/O requests to I/O queues 520-1, 520-2, and 520-3 in a manner that satisfies each VM's QoS requirements. So, for example, if a VM has established a QoS requirement of at least 10 I/O requests per second (assuming that may I/O requests are pending), FPGA 315 may prioritize I/O requests from the corresponding virtual I/O queue before forwarding I/O requests from other virtual I/O queues. (This example is somewhat arbitrary, since it implies no other VM has QoS requirements: where multiple VMs have QoS requirements, FPGA 315 may manage I/O requests in a manner that satisfies all VM QoS requirements.) Other QoS requirements, such as bandwidth requirements, may be similarly handled via FPGA 315.

Figure 11:
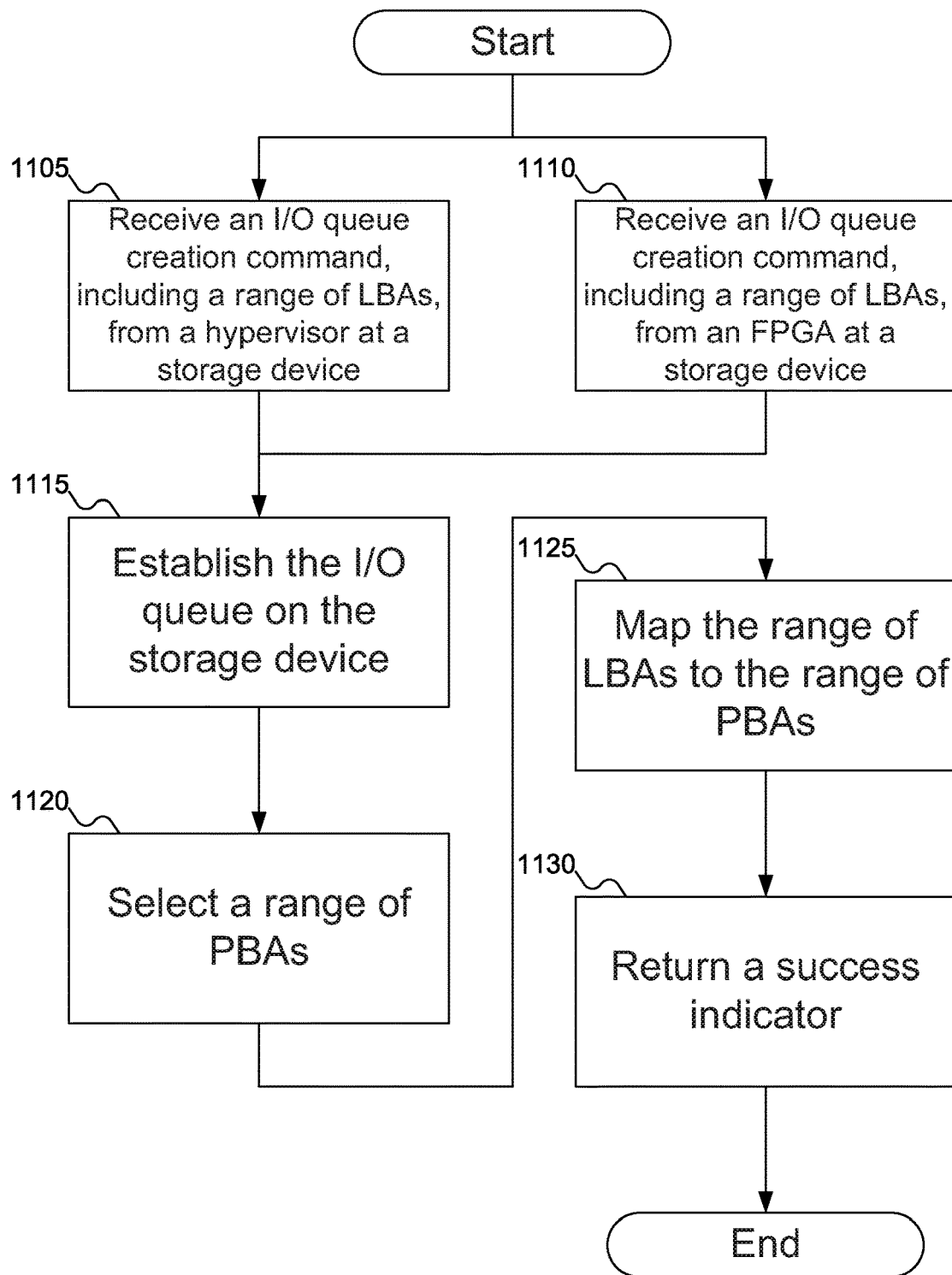
FIG. 11 shows a flowchart of an example procedure for the storage device of FIG. 1 to allocating an I/O queue for a VM, according to an embodiment of the inventive concept.

FIG. 11 shows a flowchart of an example procedure for storage device 120 of FIG. 1 to allocating I/O queue 520 of FIG. 5 for VM 305 of FIG. 3, according to an embodiment of the inventive concept. In FIG. 11, at block 1105, storage device 120 of FIG. 1 may receive I/O queue creation command 535 of FIG. 5 from hypervisor 310 of FIG. 3. Alternatively, at block 1110, storage device 120 of FIG. 1 may receive I/O queue creation command 535 of FIG. 5 from FPGA 315 of FIG. 3. In either case, I/O queue creation command 535 of FIG. 5 may include range of LBAs 710 of FIG. 7. Regardless of the source of I/O queue creation command 535 of FIG. 5, at block 1115, storage device 120 of FIG. 1 may establish I/O queue 520 of FIG. 1. At block 1120, storage device 120 of FIG. 1 may select range of PBAs 715 of FIG. 7 large enough to support range of LBAs 710 of FIG. 7 as received. At block 1125, storage device 120 of FIG. 1 may map range of LBAs 710 of FIG. 7 to range of PBAs 715 of FIG. 7. That way, when storage device 120 of FIG. 1 receives an I/O request, only range of PBAs 715 of FIG. 7 that corresponds to VM 305 of FIG. 3 may be accessed, isolating each VM from the others. In a similar way, since the mapping between range of LBAs 710 of FIG. 7 and range of PBAs 715 of FIG. 7 is reversible, given a particular physical address, the appropriate context for the I/O request may be determined, enabling the appropriate completion queue to be selected to notify VM 305 of FIG. 3 that the I/O request is complete, as suggested in block 1130 of FIG. 11 (wherein the success of the I/O request may be returned to VM 305 of FIG. 3).

Note that blocks 1105 and 1110 suggest that the extended I/O queue creation command 535 of FIG. 5 is used, regardless of the source of I/O queue creation command 535 of FIG. 5. While embodiments of the inventive concept include such possibilities, other embodiments of the inventive concept may include storage device 120 of FIG. 1 that does not support extended I/O queue creation command 535 of FIG. 5. In such embodiments of the inventive concept, FPGA 315 of FIG. 3 may support all of the functionality that simulates SR-IOV with storage device 120 of FIG. 1, and storage device 120 of FIG. 1 processes I/O requests without any context for the I/O requests. Put another way, FPGA 315 of FIG. 3 may support all of the context management and VM isolation, leaving storage device 120 of FIG. 1 to operate as a conventional storage device without implementing any of the functionality of the inventive concept.

Figure 12:
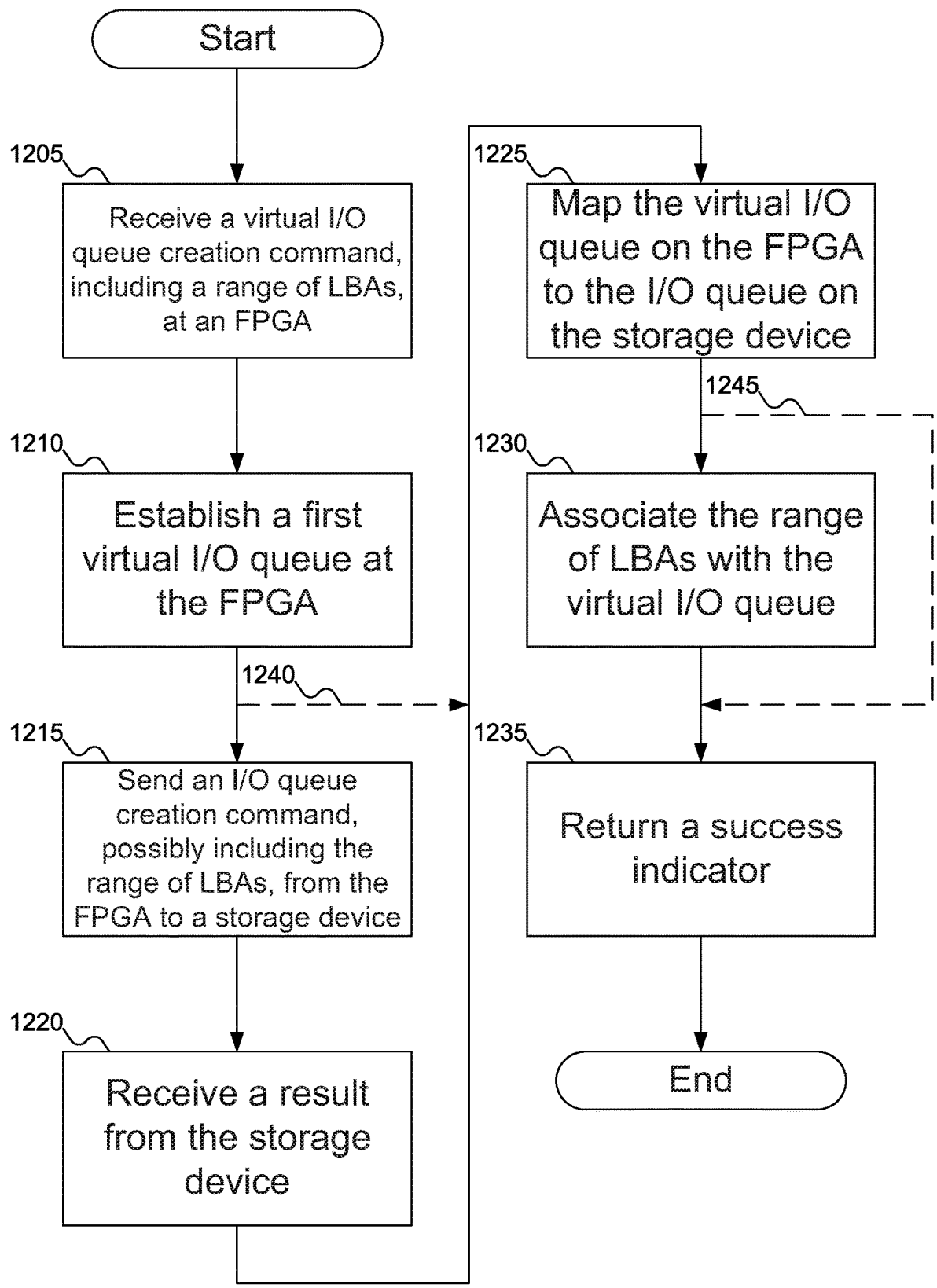
FIG. 12 shows a flowchart of an example procedure for the FPGA of FIG. 3 to allocating a virtual I/O queue for a VM, according to an embodiment of the inventive concept.

FIG. 12 shows a flowchart of an example procedure for FPGA 315 of FIG. 3 to allocating virtual I/O queue 1005 of FIG. 10 for VM 305 of FIG. 3, according to an embodiment of the inventive concept. In FIG. 12, at block 1205, FPGA 315 of FIG. 3 may receive virtual I/O queue creation command 903 of FIG. 10 from hypervisor 310 of FIG. 3. At block 1210, FPGA 315 of FIG. 3 may establish virtual I/O queue 1005 of FIG. 10 for VM 305 of FIG. 3. At block 1215, FPGA 315 of FIG. 3 may send I/O queue creation command 535 of FIG. 5 to storage device 120 of FIG. 1. Note that I/O queue creation command 535 of FIG. 5 sent to storage device 120 of FIG. 1 might be the extended version of the command if storage device 120 of FIG. 1 supports it, or a conventional I/O queue creation command if not. At block 1220, FPGA 315 of FIG. 3 may receive a result of I/O queue creation command 535 of FIG. 5 from storage device 120 of FIG. 1.

At block 1225, mapping logic 1020 of FIG. 10 may map virtual I/O queue 1005 of FIG. 10 to I/O queue 520 of FIG. 5 as established by storage device 120 of FIG. 1. At block 1230, FPGA 315 of FIG. 3 may associate range of LBAs 710 of FIG. 7 with virtual I/O queue 1005 of FIG. 10. Finally, at block 1235, FPGA 315 of FIG. 3 may return a success indicator to hypervisor 310 of FIG. 3.

A few notes above FIG. 12 are in order. First, note that while in blocks 1105 and 1110 of FIG. 11 storage device 120 of FIG. 1 might not receive extended I/O queue creation command 535 of FIG. 5 (in embodiments of the inventive concept where FPGA 315 of FIG. 3 implements all of the functionality of the inventive concept and storage device 120 of FIG. 1 is a conventional storage device), the same is not true of FPGA 315 of FIG. 3. Any command sent from hypervisor 310 of FIG. 3 to storage device 120 of FIG. 1, or any I/O request sent from VM 305 of FIG. 3 to storage device 120 of FIG. 1, passes through FPGA 315 of FIG. 3. Since such commands would include I/O queue creation commands (either actual or virtual), FPGA 315 of FIG. 3 may be expected to receive an extended I/O queue creation command. If storage device 120 of FIG. 1 may implement I/O queue creation command 535 of FIG. 5, then FPGA 315 of FIG. 3 would not necessarily need to receive virtual I/O queue creation command 903 of FIG. 10 at all (although embodiments of the inventive concept may include hypervisor 310 of FIG. 3 sending virtual I/O queue creation command 903 of FIG. 10 to FPGA 315 of FIG. 3, leaving it to FPGA 315 of FIG. 3 to either execute the command itself or issue I/O queue creation command 535 of FIG. 5 to storage device 120 of FIG. 1). And if FPGA 315 of FIG. 3 performs queue-to-VM assignment and context management, then FPGA 315 of FIG. 3 would want to receive virtual I/O queue creation command 903 of FIG. 9.

Second, note that blocks 1215 and 1220 assume that I/O queue 520 of FIG. 5 has not yet been established on storage device 120. If during execution I/O queue 520 of FIG. 5 has already been established on storage device 120 of FIG. 1 (for example, if FPGA 315 of FIG. 3 is mapping multiple virtual I/O queues 1005 of FIG. 10 to an individual I/O queue 520 of FIG. 5 on storage device 120 of FIG. 5), then blocks 1215 and 1220 may be omitted, as shown by dashed line 1240.

Third, FPGA 315 of FIG. 3 may not need to store context information for virtual I/O queue 1005 of FIG. 10. For example, if storage device 120 of FIG. 1 maps range of LBAs 710 of FIG. 7 to range of PBAs 715 of FIG. 7 and stores context information about VM 305 of FIG. 3 for I/O queue 520 of FIG. 5, then block 1230 may be omitted, as shown by dashed line 1245.

Figure 13:
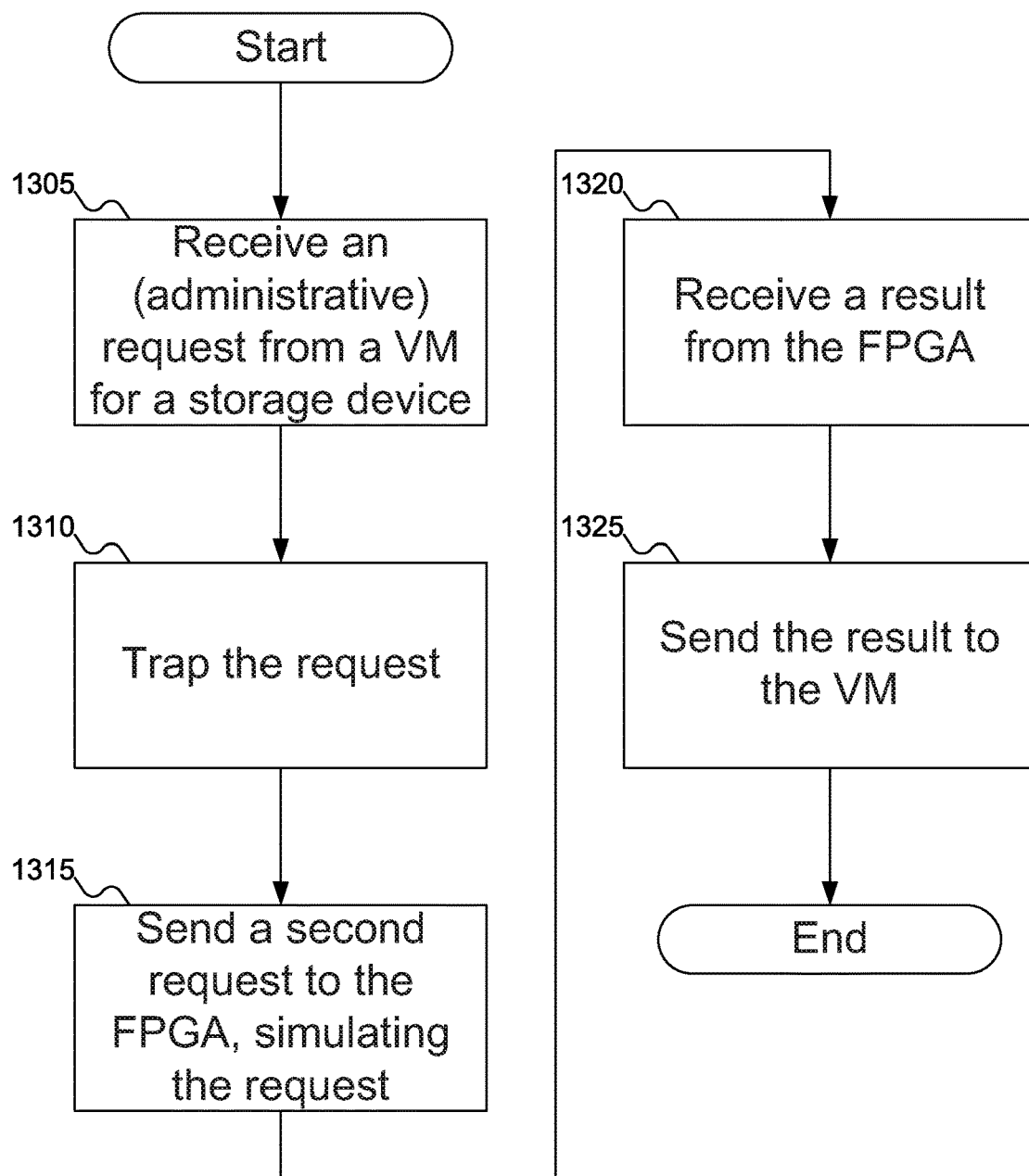
FIG. 13 shows a flowchart of an example procedure for the hypervisor of FIG. 3 to process administrative requests from the VMs of FIG. 3, according to an embodiment of the inventive concept.

FIG. 13 shows a flowchart of an example procedure for hypervisor 310 of FIG. 3 to process administrative requests from VMs 305-1, 305-2, and 305-3 of FIG. 3, according to an embodiment of the inventive concept. In FIG. 13, at block 1305, hypervisor 310 of FIG. 3 may receive an administrative request from VM 305 of FIG. 3. At block 1310, hypervisor 310 of FIG. 3 may trap the request. Then, at block 1315, hypervisor 310 of FIG. 3 may send a different (if similar) request to FPGA 315 of FIG. 3: this second request may simulate the original request. At block 1320, hypervisor 310 of FIG. 3 may receive a result from FPGA 315 of FIG. 3. Note that FPGA 315 of FIG. 3 might have processed the second request internally, or FPGA 315 of FIG. 3 might have forwarded its own request to storage device 120 of FIG. 1: hypervisor 310 of FIG. 3 is not concerned with how FPGA 315 of FIG. 3 processes the second request. Finally, at block 1325, hypervisor 310 of FIG. 3 may return the result to VM 305 of FIG. 3.

Figure 14:
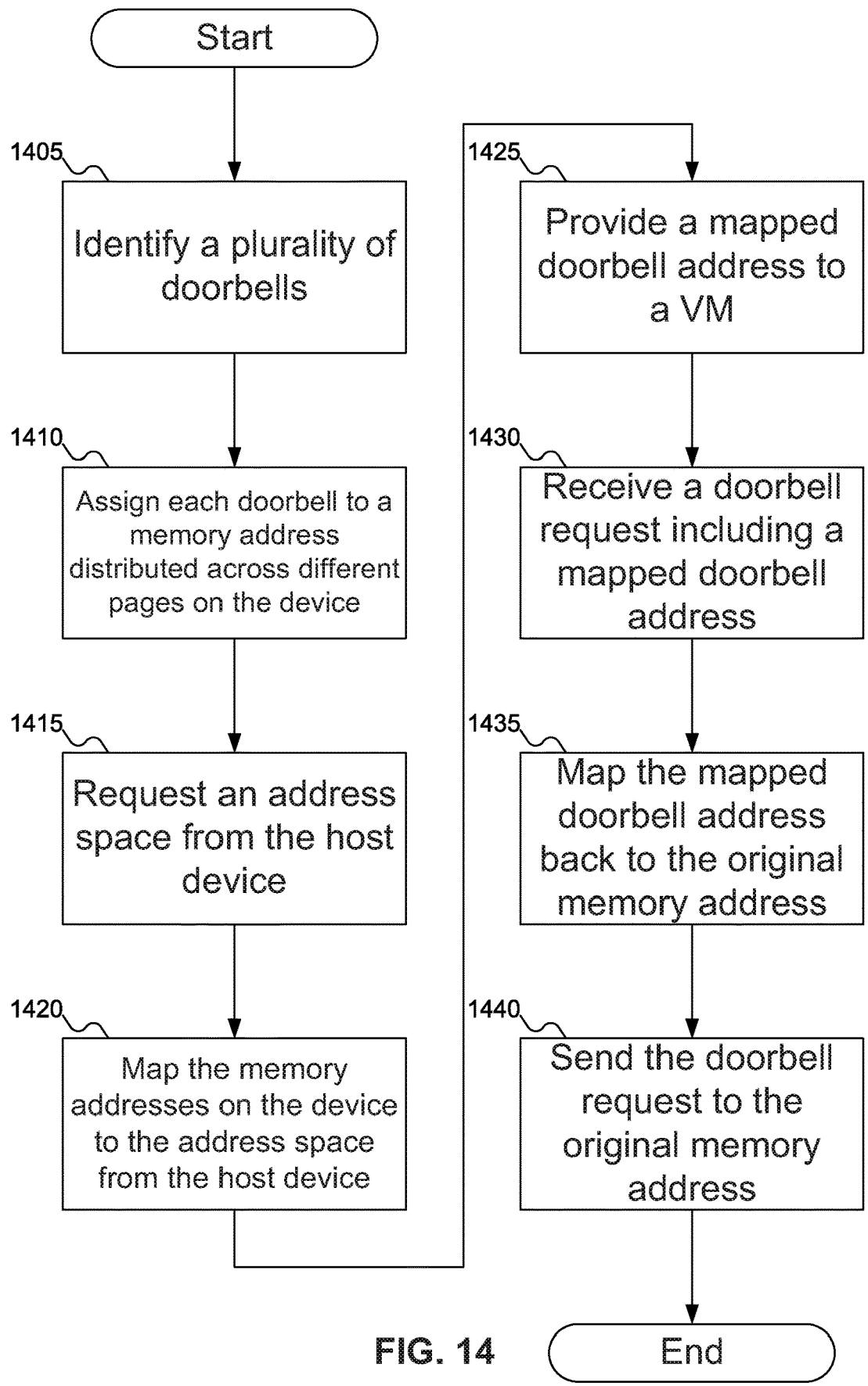
FIG. 14 shows a flowchart of an example procedure for the storage device of FIG. 1 or the FPGA of FIG. 3 to map memory addresses of doorbells to different operating system pages to support VM isolation, according to an embodiment of the inventive concept.

FIG. 14 shows a flowchart of an example procedure for storage device 120 of FIG. 1 or FPGA 315 of FIG. 3 to map memory addresses 810 of FIG. 8 of doorbells to different operating system pages 825 of FIG. 8 to support VM isolation, according to an embodiment of the inventive concept. Note that the example procedure is the same, regardless of whether the example procedure is implemented by storage device 120 of FIG. 1 or FPGA 315 of FIG. 3. For descriptive purposes, FPGA 315 of FIG. 3 will be described as performing the example process, but embodiments of the inventive concept extend to storage device 120 of FIG. 1 also performing the example process.

In FIG. 14, at block 1405, FPGA 315 of FIG. 3 may identify doorbells used to manage communication between FPGA 315 of FIG. 3 and VM 305 of FIG. 3. At block 1410, FPGA 315 of FIG. 3 may distribute memory addresses 820 of FIG. 8 across different memory pages, based on the page size of memory 130 of FIG. 1 in host device 105 of FIG. 1. For example, FPGA 315 of FIG. 3 might use a doorbell stride value to locate the doorbell memory addresses 820 of FIG. 8 in different pages. At block 1415, FPGA 315 of FIG. 3 may request an address space from host device 105 of FIG. 1. At block 1420, FPGA 315 may map memory addresses 820 of FIG. 8 to memory addresses in the requested address space. In this manner, VM isolation may be maintained, since no two VMs 305 may access their doorbells on a common memory page. At block 1425, FPGA 315 of FIG. 3 may provide VM 305 of FIG. 3 with a new memory address 820 of FIG. 8.

At block 1430, FPGA 315 of FIG. 3 may receive a request from VM 305 of FIG. 3 to access a doorbell at the mapped memory address. At block 1435, FPGA 315 of FIG. 3 may reverse the mapping, recovering original memory address 820 of FIG. 8. At block 1440, FPGA 315 of FIG. 3 may send the request to original memory address 820 of FIG. 8.

In FIGS. 11-14, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer several technical advantages over the prior art. First, by removing the requirement of hardware in storage device 120 of FIG. 1 to support VM isolation and using FPGA 315 of FIG. 3, any storage device may theoretically be used in a system requiring SR-IOV-type functionality, since FPGA 315 of FIG. 3 may enforce VM isolation. Second, as FPGA 315 of FIG. 3 may be programed at the time of installation, the specific desired functionality to be offered by the system may be established at the time of installation, rather than being fixed at the point of manufacture of storage device 120 (which might not provide an optimal solution for all installations). Third, FPGA 315 of FIG. 3 may offer more VFs than storage device 120 of FIG. 1 might offer, enabling the use of storage device 120 of FIG. 1 in systems with larger numbers of VMs. Fourth, although VM isolation is provided by FPGA 315 of FIG. 3, each VM may still have "bare-metal" access to storage device 120 of FIG. 1 for I/O requests. Fifth, doorbell memory addresses may be remapped to different O/S memory pages, further enhancing VM isolation. And sixth, because context for I/O requests may be traced back to a particular I/O queue even after being removed from that I/O queue, storage device 120 of FIG. 1 may still support the QoS requirements of VMs, avoiding the blender effect.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a storage device, comprising:
storage for data; and
at least one Input/Output (I/O) queue for requests from at least one virtual machine (VM) on a host device,
wherein the storage device supports an I/O queue creation command to request allocation of an I/O queue of the at least one I/O queue for a VM of the at least one VM, the I/O queue creation command including an LBA range attribute for a range of Logical Block Addresses (LBAs) to be associated with the I/O queue, and
wherein the storage device maps the range of LBAs to a range of Physical Block Addresses (PBAs) in the storage.

Statement 2. An embodiment of the inventive concept includes a storage device according to statement 1, wherein:
the storage device includes a Solid State Drive (SSD) storage device; and
the SSD storage device uses a Non-Volatile Memory Express (NVMe) interface to the host device.

Statement 3. An embodiment of the inventive concept includes a storage device according to statement 2, wherein the I/O queue includes a submission queue and a completion queue.

Statement 4. An embodiment of the inventive concept includes a storage device according to statement 2, wherein the storage device receives the I/O queue creation command from a hypervisor on the host device.

Statement 5. An embodiment of the inventive concept includes a storage device according to statement 2, wherein the LBA range attribute includes a starting LBA and an ending LBA.

Statement 6. An embodiment of the inventive concept includes a storage device according to statement 2, wherein:
the LBA range attribute includes a starting LBA; and
the I/O queue creation command further includes a queue size.

Statement 7. An embodiment of the inventive concept includes a storage device according to statement 2, wherein the I/O queue creation command includes a Quality of Service (QoS) attribute for Quality of Service parameters for the VM.

Statement 8. An embodiment of the inventive concept includes a storage device according to statement 7, wherein the QoS attribute is drawn from a set including a minimum bandwidth, a maximum bandwidth, a minimum number of read requests per second, a maximum number of read requests per second, a minimum number of bytes read per second, a maximum number of bytes read per second, a minimum number of write requests per second, a maximum number of write requests per second, a minimum number of bytes written per second, and a maximum number of bytes written per second.

Statement 9. An embodiment of the inventive concept includes a storage device according to statement 2, wherein the I/O queue creation command includes a shared namespace attribute specifying an array of namespaces to share access to the range of LBAs.

Statement 10. An embodiment of the inventive concept includes a storage device according to statement 2, further comprising a doorbell distribution logic to locate a first doorbell for the I/O queue in a different page of memory than a second doorbell for a second I/O queue.

Statement 11. An embodiment of the inventive concept includes a storage device according to statement 2, further comprising a Field Programmable Gate Array (FPGA) that maps a plurality of virtual I/O queues to the I/O queue, wherein:
the FPGA supports a virtual I/O queue creation command to request allocation of a first virtual I/O queue of the plurality of virtual I/O queues, the virtual I/O queue creation command including a second LBA range attribute for a second range of Logical Block Addresses (LBAs) to be associated with the first virtual I/O queue, the first virtual I/O queue associated with the I/O queue.

Statement 12. An embodiment of the inventive concept includes a storage device according to statement 11, wherein the FPGA includes a mapping logic to map the first virtual I/O queue to the I/O queue on the storage device, so that I/O requests received from the VM in the first virtual I/O queue are delivered to the storage device via the I/O queue and results received from the storage device in the I/O queue are delivered to the VM via the first virtual I/O queue.

Statement 13. An embodiment of the inventive concept includes a storage device according to statement 11, wherein a second virtual I/O queue of the FPGA is associated with the I/O queue.

Statement 14. An embodiment of the inventive concept includes a storage device according to statement 11, wherein the FPGA is operative to invoke the I/O queue creation command on the storage device.

Statement 15. An embodiment of the inventive concept includes a storage device according to statement 11, wherein the FPGA is operative to receive the virtual I/O queue creation command from the hypervisor on the host device.

Statement 16. An embodiment of the inventive concept includes a storage device according to statement 15, wherein the FPGA is operative to receive the virtual I/O queue creation command from the hypervisor for the VM on the host device.

Statement 17. An embodiment of the inventive concept includes a storage device according to statement 11, wherein the second LBA range attribute includes a second starting LBA and a second ending LBA.

Statement 18. An embodiment of the inventive concept includes a storage device according to statement 11, wherein:
the second LBA range attribute includes a second starting LBA; and
the virtual I/O queue creation command further includes a second queue size.

Statement 19. An embodiment of the inventive concept includes a storage device according to statement 11, wherein the virtual I/O queue creation command includes a second QoS attribute for Quality of Service parameters for the VM.

Statement 20. An embodiment of the inventive concept includes a storage device according to statement 19, wherein the second QoS attribute is drawn from a set including a second minimum bandwidth, a second maximum bandwidth, a second minimum number of read requests per second, a second maximum number of read requests per second, a second minimum number of bytes read per second, a second maximum number of bytes read per second, a second minimum number of write requests per second, a second maximum number of write requests per second, a second minimum number of bytes written per second, and a second maximum number of bytes written per second.

Statement 21. An embodiment of the inventive concept includes a storage device according to statement 11, wherein the virtual I/O queue creation command includes a second shared namespace attribute specifying a second array of namespaces to share access to the range of LBAs.

Statement 22. An embodiment of the inventive concept includes a storage device according to statement 2, wherein the FPGA further includes a doorbell distribution logic to locate a first virtual doorbell for the first virtual I/O queue in a different page of memory than a second doorbell for a second virtual I/O queue.

Statement 23. An embodiment of the inventive concept includes a Field Programmable Gate Array (FPGA), comprising:

at least one virtual Input/Output (I/O) queue for requests from at least one virtual machine (VM) on a host device; and a mapping logic to map a virtual I/O queue of the at least one virtual I/O queue to an I/O queue on a storage device, so that I/O requests received from the VM in the virtual I/O queue are delivered to the storage device via the I/O queue and results received from the storage device in the I/O queue are delivered to the VM via the virtual I/O queue, wherein the FPGA supports a virtual I/O queue creation command to request allocation of the virtual I/O queue of the at least one virtual I/O queue for a VM of the at least one VM, the virtual I/O queue creation command including an LBA range attribute for a range of Logical Block Addresses (LBAs) to be associated with the virtual I/O queue, and wherein a storage device, separate from but connected to the FPGA, maps the range of LBAs to a range of Physical Block Addresses (PBAs) in the storage device.

Statement 24. An embodiment of the inventive concept includes an FPGA according to statement 23, wherein the virtual I/O queue includes a submission queue and a completion queue.

Statement 25. An embodiment of the inventive concept includes an FPGA according to statement 23, wherein the FPGA receives the virtual I/O queue creation command from a hypervisor for the VM on the host device.

Statement 26. An embodiment of the inventive concept includes an FPGA according to statement 23, wherein the LBA range attribute includes a starting LBA and an ending LBA.

Statement 27. An embodiment of the inventive concept includes an FPGA according to statement 23, wherein:
the LBA range attribute includes a starting LBA; and
the virtual I/O queue creation command further includes a queue size.

Statement 28. An embodiment of the inventive concept includes an FPGA according to statement 23, wherein the virtual I/O queue creation command includes a Quality of Service (QoS) attribute for Quality of Service parameters for the VM.

Statement 29. An embodiment of the inventive concept includes an FPGA according to statement 28, wherein the QoS attribute is drawn from a set including a minimum bandwidth, a maximum bandwidth, a minimum number of read requests per second, a maximum number of read requests per second, a minimum number of bytes read per second, a maximum number of bytes read per second, a minimum number of write requests per second, a maximum number of write requests per second, a minimum number of bytes written per second, and a maximum number of bytes written per second.

Statement 30. An embodiment of the inventive concept includes an FPGA according to statement 23, wherein the virtual I/O queue creation command includes a shared namespace attribute specifying an array of namespaces to share access to the range of LBAs.

Statement 31. An embodiment of the inventive concept includes an FPGA according to statement 23, wherein the FPGA maps a plurality of virtual I/O queues to the I/O queue on the storage device.

Statement 32. An embodiment of the inventive concept includes an FPGA according to statement 31, wherein the FPGA is operative to invoke an I/O queue creation command on the storage device to create the I/O queue.

Statement 33. An embodiment of the inventive concept includes an FPGA according to statement 32, wherein the I/O queue creation command includes a second LBA attribute for a second range of LBAs to be associated with the I/O queue.

Statement 34. An embodiment of the inventive concept includes a storage device according to statement 23, further comprising a doorbell distribution logic to locate a first virtual doorbell for the virtual I/O queue in a different page of memory than a second doorbell for a second virtual I/O queue.

Statement 35. An embodiment of the inventive concept includes a method, comprising:

receiving an I/O queue creation command at a storage device for a first VM on a host device, the I/O queue creation command including at least an LBA range attribute for a range of Logical Block Addresses (LBAs) to be associated with an I/O queue on the storage device;

establishing the I/O queue on the storage device;

selecting a range of Physical Block Addresses (PBAs) on the storage device at least as large as the range of the LBAs;

mapping the range of LBAs to the range of PBAs; and
returning a success indicator, wherein a second VM on the host device is thereby denied access to the range of PBAs.

Statement 36. An embodiment of the inventive concept includes a method according to statement 35, wherein:
the storage device includes a Solid State Drive (SSD) storage device; and
the SSD storage device uses a Non-Volatile Memory Express (NVMe) interface to the host device.

Statement 37. An embodiment of the inventive concept includes a method according to statement 36, wherein the I/O queue includes a submission queue and a completion queue.

Statement 38. An embodiment of the inventive concept includes a method according to statement 36, wherein receiving an I/O queue creation command for a first VM on a host device includes receiving the I/O queue creation command from a hypervisor for the first VM on the host device.

Statement 39. An embodiment of the inventive concept includes a method according to statement 36, wherein receiving an I/O queue creation command for a first VM on a host device includes receiving the I/O queue creation command from a Field Programmable Gate Array (FPGA) for the first VM on the host device.

Statement 40. An embodiment of the inventive concept includes a method according to statement 39, wherein the FPGA is included in the storage device.

Statement 41. An embodiment of the inventive concept includes a method according to statement 39, wherein the FPGA is separate from but connected to the storage device.

Statement 42. An embodiment of the inventive concept includes a method according to statement 36, wherein the LBA range attribute includes a starting LBA and an ending LBA.

Statement 43. An embodiment of the inventive concept includes a method according to statement 36, wherein:
the LBA range attribute includes a starting LBA; and
the I/O queue creation command further includes a queue size.

Statement 44. An embodiment of the inventive concept includes a method according to statement 36, wherein the I/O queue creation command includes a Quality of Service (QOS) attribute for Quality of Service parameters for the first VM.

Statement 45. An embodiment of the inventive concept includes a method according to statement 44, wherein the QoS attribute is drawn from a set including a minimum bandwidth, a maximum bandwidth, a minimum number of read requests per second, a maximum number of read requests per second, a minimum number of bytes read per second, a maximum number of bytes read per second, a minimum number of write requests per second, a maximum number of write requests per second, a minimum number of bytes written per second, and a maximum number of bytes written per second.

Statement 46. An embodiment of the inventive concept includes a method according to statement 36, wherein the I/O queue creation command includes a shared namespace attribute specifying an array of namespaces to share access to the range of LBAs.

Statement 47. An embodiment of the inventive concept includes a method according to statement 36, further comprising:
identifying a plurality of doorbells associated with a plurality of I/O queues;
assigning each of the plurality of doorbells to a memory address in a first plurality of memory addresses in the storage device, the first plurality of memory addresses distributed across a plurality of memory pages;
requesting an address space from the host device;
mapping the first plurality of memory addresses to a second plurality of memory addresses in the address space, the second plurality of memory addresses distributed across a plurality of memory pages; and
providing at least a doorbell address of the second plurality memory addresses to the first VM.

Statement 48. An embodiment of the inventive concept includes a method according to statement 47, further comprising:
receiving a doorbell request to access the doorbell address;
mapping the doorbell address back to an address in the first plurality of memory addresses; and
sending the doorbell request to the address in the first plurality of memory addresses.

Statement 49. An embodiment of the inventive concept includes a method, comprising:
receiving a virtual I/O queue creation command at a Field Programmable Gate Array (FPGA) from a hypervisor for a first VM on a host device, the virtual I/O queue creation command including at least an LBA range attribute for a range of Logical Block Addresses (LBAs) to be associated with an I/O queue on the storage device;
establishing a first virtual I/O queue on the FPGA;
sending an I/O queue creation command to a storage device to establish an I/O queue on the storage device;
receiving a result from the storage device;
mapping the first virtual I/O queue to the I/O queue;
associating the range of LBAs with the first virtual I/O queue; and
returning a success indicator to the hypervisor,
wherein the range of LBAs maps to a range of Physical Block Addresses (PBAs) on the storage device, and
wherein a second VM on the host device is thereby denied access to the range of PBAs.

Statement 50. An embodiment of the inventive concept includes a method according to statement 49, wherein the first virtual I/O queue includes a submission queue and a completion queue.

Statement 51. An embodiment of the inventive concept includes a method according to statement 49, wherein the FPGA maps both the first virtual I/O queue and a second virtual I/O queue to the I/O queue.

Statement 52. An embodiment of the inventive concept includes a method according to statement 49, wherein the I/O queue creation command includes the LBA range attribute for the range of LBAs.

Statement 53. An embodiment of the inventive concept includes a method according to statement 49, wherein the LBA range attribute includes a starting LBA and an ending LBA.

Statement 54. An embodiment of the inventive concept includes a method according to statement 49, wherein:
the LBA range attribute includes a starting LBA; and
the virtual I/O queue creation command further includes a queue size.

Statement 55. An embodiment of the inventive concept includes a method according to statement 49, wherein the virtual I/O queue creation command includes a Quality of Service (QoS) attribute for Quality of Service parameters for the first VM.

Statement 56. An embodiment of the inventive concept includes a method according to statement 55, wherein the QoS attribute is drawn from a set including a minimum bandwidth, a maximum bandwidth, a minimum number of read requests per second, a maximum number of read requests per second, a minimum number of bytes read per second, a maximum number of bytes read per second, a minimum number of write requests per second, a maximum number of write requests per second, a minimum number of bytes written per second, and a maximum number of bytes written per second.

Statement 57. An embodiment of the inventive concept includes a method according to statement 49, wherein the virtual I/O queue creation command includes a shared namespace attribute specifying an array of namespaces to share access to the range of LBAs.

Statement 58. An embodiment of the inventive concept includes a method according to statement 49, further comprising:

identifying a plurality of doorbells associated with a plurality of I/O queues;
assigning each of the plurality of doorbells to a memory address in a first plurality of memory addresses in the FPGA, the first plurality of memory addresses distributed across a plurality of memory pages;
requesting an address space from the host device;
mapping the first plurality of memory addresses to a second plurality of memory addresses in the address space, the second plurality of memory addresses distributed across a plurality of memory pages; and
providing at least a doorbell address of the second plurality memory addresses to the first VM.

Statement 59. An embodiment of the inventive concept includes a method according to statement 58, further comprising:
receiving a doorbell request to access the doorbell address;
mapping the doorbell address back to an address in the first plurality of memory addresses; and
sending the doorbell request to the address in the first plurality of memory addresses.

Statement 60. An embodiment of the inventive concept includes a method, comprising:
receiving a first request from a virtual machine (VM) on a host device, the first request destined for a storage device;
trapping the first request from reaching the storage device;
sending a second request to a Field Programmable Gate Array (FPGA), the second request simulating the first request;
receiving a result of the second request from the FPGA; and
sending the result of the second request to the VM.

Statement 61. An embodiment of the inventive concept includes a method according to statement 60, wherein:
the first request includes a first PCI configuration space request to access a first PCI configuration space; and
the second request includes a second PCI configuration space request to access a second PCI configuration space.

Statement 62. An embodiment of the inventive concept includes a method according to statement 60, wherein:
the first request includes an I/O queue creation request for the storage device to create an I/O queue; and
the second request includes a virtual I/O queue creation request for the FPGA to create a virtual I/O queue.

Statement 63. An embodiment of the inventive concept includes a method according to statement 62, wherein the second request further includes a Logical Block Address (LBA) attribute for a range of LBAs to be associated with the virtual I/O queue.

Statement 64. An embodiment of the inventive concept includes a method according to statement 63, wherein the virtual I/O queue creation request includes a shared namespace attribute specifying an array of namespaces to share access to the range of LBAs.

Statement 65. An embodiment of the inventive concept includes a method according to statement 62, wherein the second request further includes a Quality of Service (QOS) attribute for Quality of Service parameters for the VM.

Statement 66. An embodiment of the inventive concept includes a method according to statement 65, wherein the QoS attribute is drawn from a set including a minimum bandwidth, a maximum bandwidth, a minimum number of read requests per second, a maximum number of read requests per second, a minimum number of bytes read per second, a maximum number of bytes read per second, a minimum number of write requests per second, a maximum number of write requests per second, a minimum number of bytes written per second, and a maximum number of bytes written per second.

Statement 67. An embodiment of the inventive concept includes an article, comprising a non-transitory storage medium, the non-transitory storage medium having stored thereon instructions that, when executed by a machine, result in:
receiving an I/O queue creation command at a storage device for a first VM on a host device, the I/O queue creation command including at least an LBA range attribute for a range of Logical Block Addresses (LBAs) to be associated with an I/O queue on the storage device;
establishing the I/O queue on the storage device;
selecting a range of Physical Block Addresses (PBAs) on the storage device at least as large as the range of the LBAs;
mapping the range of LBAs to the range of PBAs; and
returning a success indicator,
wherein a second VM on the host device is thereby denied access to the range of PBAs.

Statement 68. An embodiment of the inventive concept includes an article according to statement 67, wherein:
the storage device includes a Solid State Drive (SSD) storage device; and
the SSD storage device uses a Non-Volatile Memory Express (NVMe) interface to the host device.

Statement 69. An embodiment of the inventive concept includes an article according to statement 68, wherein the I/O queue includes a submission queue and a completion queue.

Statement 70. An embodiment of the inventive concept includes an article according to statement 68, wherein receiving an I/O queue creation command for a first VM on a host device includes receiving the I/O queue creation command from a hypervisor for the first VM on the host device.

Statement 71. An embodiment of the inventive concept includes an article according to statement 68, wherein receiving an I/O queue creation command for a first VM on a host device includes receiving the I/O queue creation command from a Field Programmable Gate Array (FPGA) for the first VM on the host device.

Statement 72. An embodiment of the inventive concept includes an article according to statement 71, wherein the FPGA is included in the storage device.

Statement 73. An embodiment of the inventive concept includes an article according to statement 71, wherein the FPGA is separate from but connected to the storage device.

Statement 74. An embodiment of the inventive concept includes an article according to statement 68, wherein the LBA range attribute includes a starting LBA and an ending LBA.

Statement 75. An embodiment of the inventive concept includes an article according to statement 68, wherein:
the LBA range attribute includes a starting LBA; and
the I/O queue creation command further includes a queue size.

Statement 76. An embodiment of the inventive concept includes an article according to statement 68, wherein the I/O queue creation command includes a Quality of Service (QOS) attribute for Quality of Service parameters for the first VM.

Statement 77. An embodiment of the inventive concept includes an article according to statement 76, wherein the QoS attribute is drawn from a set including a minimum bandwidth, a maximum bandwidth, a minimum number of read requests per second, a maximum number of read requests per second, a minimum number of bytes read per second, a maximum number of bytes read per second, a minimum number of write requests per second, a maximum number of write requests per second, a minimum number of bytes written per second, and a maximum number of bytes written per second.

Statement 78. An embodiment of the inventive concept includes an article according to statement 68, wherein the I/O queue creation command includes a shared namespace attribute specifying an array of namespaces to share access to the range of LBAs.

Statement 79. An embodiment of the inventive concept includes an article according to statement 68, further comprising:

identifying a plurality of doorbells associated with a plurality of I/O queues;

assigning each of the plurality of doorbells to a memory address in a first plurality of memory addresses in the storage device, the first plurality of memory addresses distributed across a plurality of memory pages;

requesting an address space from the host device;

mapping the first plurality of memory addresses to a second plurality of memory addresses in the address space, the second plurality of memory addresses distributed across a plurality of memory pages; and providing at least a doorbell address of the second plurality memory addresses to the first VM.

Statement 80. An embodiment of the inventive concept includes an article according to statement 79, further comprising:

receiving a doorbell request to access the doorbell address;

mapping the doorbell address back to an address in the first plurality of memory addresses; and sending the doorbell request to the address in the first plurality of memory addresses.

Statement 81. An embodiment of the inventive concept includes an article, comprising a non-transitory storage medium, the non-transitory storage medium having stored thereon instructions that, when executed by a machine, result in:

receiving a virtual I/O queue creation command at a Field Programmable Gate Array (FPGA) from a hypervisor for a first VM on a host device, the virtual I/O queue creation command including at least an LBA range attribute for a range of Logical Block Addresses (LBAs) to be associated with an I/O queue on the storage device;

establishing a first virtual I/O queue on the FPGA;

sending an I/O queue creation command to a storage device to establish an I/O queue on the storage device;

receiving a result from the storage device;

mapping the first virtual I/O queue to the I/O queue;

associating the range of LBAs with the first virtual I/O queue; and returning a success indicator to the hypervisor, wherein the range of LBAs maps to a range of Physical Block Addresses (PBAs) on the storage device, and wherein a second VM on the host device is thereby denied access to the range of PBAs.

Statement 82. An embodiment of the inventive concept includes an article according to statement 81, wherein the first virtual I/O queue includes a submission queue and a completion queue.

Statement 83. An embodiment of the inventive concept includes an article according to statement 81, wherein the FPGA maps both the first virtual I/O queue and a second virtual I/O queue to the I/O queue.

Statement 84. An embodiment of the inventive concept includes an article according to statement 81, wherein the I/O queue creation command includes the LBA range attribute for the range of LBAs.

Statement 85. An embodiment of the inventive concept includes an article according to statement 81, wherein the LBA range attribute includes a starting LBA and an ending LBA.

Statement 86. An embodiment of the inventive concept includes an article according to statement 81, wherein:

the LBA range attribute includes a starting LBA; and the virtual I/O queue creation command further includes a queue size.

Statement 87. An embodiment of the inventive concept includes an article according to statement 81, wherein the virtual I/O queue creation command includes a Quality of Service (QoS) attribute for Quality of Service parameters for the first VM.

Statement 88. An embodiment of the inventive concept includes an article according to statement 87, wherein the QoS attribute is drawn from a set including a minimum bandwidth, a maximum bandwidth, a minimum number of read requests per second, a maximum number of read requests per second, a minimum number of bytes read per second, a maximum number of bytes read per second, a minimum number of write requests per second, a maximum number of write requests per second, a minimum number of bytes written per second, and a maximum number of bytes written per second.

Statement 89. An embodiment of the inventive concept includes an article according to statement 81, wherein the virtual I/O queue creation command includes a shared namespace attribute specifying an array of namespaces to share access to the range of LBAs.

Statement 90. An embodiment of the inventive concept includes an article according to statement 81, further comprising:

identifying a plurality of doorbells associated with a plurality of I/O queues;

assigning each of the plurality of doorbells to a memory address in a first plurality of memory addresses in the FPGA, the first plurality of memory addresses distributed across a plurality of memory pages;

requesting an address space from the host device;

mapping the first plurality of memory addresses to a second plurality of memory addresses in the address space, the second plurality of memory addresses distributed across a plurality of memory pages; and providing at least a doorbell address of the second plurality memory addresses to the first VM.

Statement 91. An embodiment of the inventive concept includes an article according to statement 90, further comprising:

receiving a doorbell request to access the doorbell address;

mapping the doorbell address back to an address in the first plurality of memory addresses; and sending the doorbell request to the address in the first plurality of memory addresses.

Statement 92. An embodiment of the inventive concept includes an article, comprising a non-transitory storage medium, the non-transitory storage medium having stored thereon instructions that, when executed by a machine, result in:

receiving a first request from a virtual machine (VM) on a host device, the first request destined for a storage device;

trapping the first request from reaching the storage device;

sending a second request to a Field Programmable Gate Array (FPGA), the second request simulating the first request;

receiving a result of the second request from the FPGA; and sending the result of the second request to the VM.

Statement 93. An embodiment of the inventive concept includes an article according to statement 92, wherein:

the first request includes a first PCI configuration space request to access a first PCI configuration space; and the second request includes a second PCI configuration space request to access a second PCI configuration space.

Statement 94. An embodiment of the inventive concept includes an article according to statement 92, wherein:

the first request includes an I/O queue creation request for the storage device to create an I/O queue; and the second request includes a virtual I/O queue creation request for the FPGA to create a virtual I/O queue.

Statement 95. An embodiment of the inventive concept includes an article according to statement 94, wherein the second request further includes a Logical Block Address (LBA) attribute for a range of LBAs to be associated with the virtual I/O queue.

Statement 96. An embodiment of the inventive concept includes an article according to statement 95, wherein the virtual I/O queue creation request includes a shared namespace attribute specifying an array of namespaces to share access to the range of LBAs.

Statement 97. An embodiment of the inventive concept includes an article according to statement 94, wherein the second request further includes a Quality of Service (QOS) attribute for Quality of Service parameters for the VM.

Statement 98. An embodiment of the inventive concept includes an article according to statement 97, wherein the QoS attribute is drawn from a set including a minimum bandwidth, a maximum bandwidth, a minimum number of read requests per second, a maximum number of read requests per second, a minimum number of bytes read per second, a maximum number of bytes read per second, a minimum number of write requests per second, a maximum number of write requests per second, a minimum number of bytes written per second, and a maximum number of bytes written per second.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A storage device, comprising:

storage for data;

a first Input/Output (I/O) queue for a first request from a first virtual machine (VM) on a host device; and a second Input/Output (I/O) queue for a second request from a second VM on a host device, wherein the storage device supports an I/O queue creation command to request allocation of the first I/O queue for the first VM, the I/O queue creation command including a Logical Block Address (LBA) range attribute for a range of LBAs to be associated with the first I/O queue, and to request allocation of the second I/O queue for the second VM, wherein the storage device maps the range of LBAs to a range of Physical Block Addresses (PBAs) in the storage for data, and wherein the I/O queue creation command includes a shared namespace attribute specifying an array of namespaces including at least a first namespace to share access to at least one PBA in the range of PBAs, wherein a second namespace also shares access to the at least one PBA in the range of PBAs.

2. The storage device according to claim 1, wherein:

the storage device includes a Solid State Drive (SSD) storage device; and the SSD storage device uses a Non-Volatile Memory Express (NVMe) interface to the host device.

3. The storage device according to claim 2, wherein the I/O queue creation command includes a Quality of Service (QOS) attribute for Quality of Service parameters for the first VM, the QoS attribute at least one of a minimum bandwidth, a maximum bandwidth, a minimum number of read requests per second, a maximum number of read requests per second, a minimum number of bytes read per second, a maximum number of bytes read per second, a minimum number of write requests per second, a maximum number of write requests per second, a minimum number of bytes written per second, or a maximum number of bytes written per second.

4. The storage device according to claim 2, wherein the storage device receives the I/O queue creation command from a hypervisor on the host device.

5. The storage device according to claim 2, wherein the LBA range attribute includes a starting LBA and an ending LBA.

6. The storage device according to claim 2, wherein:

the LBA range attribute includes a starting LBA; and the I/O queue creation command further includes a queue size.

7. The storage device according to claim 2, further comprising a Field Programmable Gate Array (FPGA) that associates a first virtual I/O queue with the first I/O queue, wherein:

the FPGA supports a virtual I/O queue creation command to request allocation of the first virtual I/O queue, the virtual I/O queue creation command including a second LBA range attribute for a second range of LBAs to be associated with the first virtual I/O queue, the first virtual I/O queue associated with the first I/O queue.

8. The storage device according to claim 7, wherein the FPGA includes a circuit to associate the first virtual I/O queue of the FPGA with the first I/O queue on the storage device, so that the first request received from the first VM using the first virtual I/O queue of the FPGA is delivered to the first I/O queue of the storage device and a result received from the first I/O queue of the storage device is delivered to the first VM using the first virtual I/O queue of the FPGA.

9. The storage device according to claim 8, wherein the circuit associates a second virtual I/O queue of the FPGA with the first I/O queue.

10. The storage device according to claim 7, wherein the FPGA is configured to invoke the I/O queue creation command on the storage device.

11. The storage device according to claim 7, wherein the FPGA is configured to receive the virtual I/O queue creation command from the hypervisor on the host device.

12. The storage device according to claim 7, wherein the virtual I/O queue creation command includes a second QoS attribute for Quality of Service parameters for the first VM.

13. The storage device according to claim 7, wherein the second LBA range attribute includes a second starting LBA and a second ending LBA.

14. The storage device according to claim 7, wherein:
the second LBA range attribute includes a second starting LBA; and
the virtual I/O queue creation command further includes a second queue size.

15. The storage device according to claim 7, wherein the virtual I/O queue creation command includes a second shared namespace attribute specifying a second array of namespaces including at least a third namespace to share access to the at least one PBA in the range of PBAs.

16. The storage device according to claim 7, wherein the FPGA further includes a doorbell distribution circuit to locate a first virtual doorbell for the first virtual I/O queue in a first page of memory and to locate a second doorbell for a second virtual I/O queue in a second page of memory, the first page of memory different from the second page of memory.

17. The storage device according to claim 2, further comprising a doorbell distribution circuit to locate a first doorbell for the first I/O queue in a first page of memory and to locate a second doorbell for the second I/O queue in a second page of memory, the first page of memory different from the second page of memory.

18. The storage device according to claim 2, further comprising:
a receiver to receive the I/O queue creation command from the first VM; and
a circuit to allocate the first I/O queue for the first VM based on the I/O queue creation command.

19. The storage device according to claim 9, wherein a third request received from a third VM using the second virtual I/O queue of the FPGA is delivered to the first I/O queue of the storage device and a second result received from the first I/O queue of the storage device is delivered to the third VM using the second virtual I/O queue of the FPGA.

* * * * *